US009832500B2

(12) United States Patent
Tremols et al.

(10) Patent No.: US 9,832,500 B2
(45) Date of Patent: Nov. 28, 2017

(54) SYSTEM FOR ENABLING A VIRTUAL THEATER

(71) Applicants: Jose Guillermo Tremols, Miami, FL (US); Natalie Sigillito Tremols, Miami, FL (US); George E. McArdle, Jr., Coral Gables, FL (US)

(72) Inventors: Jose Guillermo Tremols, Miami, FL (US); Natalie Sigillito Tremols, Miami, FL (US); George E. McArdle, Jr., Coral Gables, FL (US)

(73) Assignee: TiltedGlobe LLC, Coral Gables, FL (US)

( * ) Notice: Subject to any disclaimer, the term of this patent is extended or adjusted under 35 U.S.C. 154(b) by 0 days.

(21) Appl. No.: 14/790,528

(22) Filed: Jul. 2, 2015

(65) Prior Publication Data

US 2016/0007060 A1   Jan. 7, 2016

Related U.S. Application Data

(60) Provisional application No. 62/021,116, filed on Jul. 5, 2014.

(51) Int. Cl.
*H04N 21/2543* (2011.01)
*H04N 21/2385* (2011.01)
(Continued)

(52) U.S. Cl.
CPC ..... *H04N 21/2543* (2013.01); *H04N 21/2187* (2013.01); *H04N 21/2385* (2013.01);
(Continued)

(58) Field of Classification Search
None
See application file for complete search history.

(56) References Cited

U.S. PATENT DOCUMENTS

| 5,729,535 A * | 3/1998 | Rostoker | H04N 5/38 348/E5.093 |
| 7,340,759 B1 * | 3/2008 | Rodriguez | H04N 21/2385 348/E5.002 |
| 7,355,980 B2 | 4/2008 | Bauer et al. | |
| 7,552,228 B2 | 6/2009 | Parasnis et al. | |
| 7,640,303 B2 | 12/2009 | Blumofe | |

(Continued)

OTHER PUBLICATIONS https://sellfy.com/sell/.
http://www.on24.com/platform-10-webcasting.

*Primary Examiner* — Michael Telan
(74) *Attorney, Agent, or Firm* — Mintz Levin Cohn Ferris Glovsky and Popeo, P.C.

(57) ABSTRACT

The disclosed virtual theater system includes capture devices for capturing video and audio of a live event and converting the video and audio into a data stream. The system also includes a production center for receiving the data stream and compressing the data stream to generate a compressed data stream, for determining the number of one or more viewing devices subscribed or reserved to view the live event, and for determining data bandwidth consumption characteristics of the one or more viewing devices. Also included is a server for receiving the compressed data stream, the number of one or more viewing devices, and the data bandwidth consumption characteristics from the production center over a network. The server also duplicates and divides the compressed data stream out to the one or more viewing devices depending on the number of viewing devices subscribed or reserved (cyberseats reserved) to view the live event.

20 Claims, 29 Drawing Sheets

(51) Int. Cl.
*H04N 21/25* (2011.01)
*H04N 21/24* (2011.01)
*H04N 21/2187* (2011.01)
*H04N 21/262* (2011.01)

(52) U.S. Cl.
CPC ..... *H04N 21/2402* (2013.01); *H04N 21/2408* (2013.01); *H04N 21/251* (2013.01); *H04N 21/25435* (2013.01); *H04N 21/26216* (2013.01); *H04N 21/26225* (2013.01); *H04N 21/26233* (2013.01)

(56) References Cited

U.S. PATENT DOCUMENTS

| | | | |
|---|---|---|---|
| 8,099,757 B2 | 1/2012 | Riedl et al. | |
| 8,442,424 B2 | 5/2013 | Socolof | |
| 8,949,922 B2 | 2/2015 | Perlman et al. | |
| 9,167,275 B1* | 10/2015 | Daily | H04N 21/812 |
| 2004/0006708 A1* | 1/2004 | Mukherjee | H04L 12/4679 |
| | | | 726/15 |
| 2005/0168693 A1 | 8/2005 | Mizer et al. | |
| 2008/0133767 A1 | 6/2008 | Birrer et al. | |
| 2011/0149145 A1* | 6/2011 | Ramos | H04N 21/23439 |
| | | | 348/441 |
| 2014/0032781 A1* | 1/2014 | Casey | H04N 21/2662 |
| | | | 709/233 |
| 2014/0229245 A1 | 8/2014 | Strauss et al. | |
| 2014/0280764 A1 | 9/2014 | Dasher et al. | |
| 2014/0351871 A1* | 11/2014 | Bomfim | H04L 65/4084 |
| | | | 725/93 |
| 2015/0067715 A1 | 3/2015 | Koat et al. | |

* cited by examiner

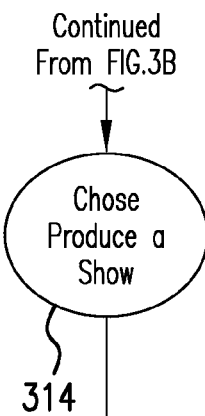
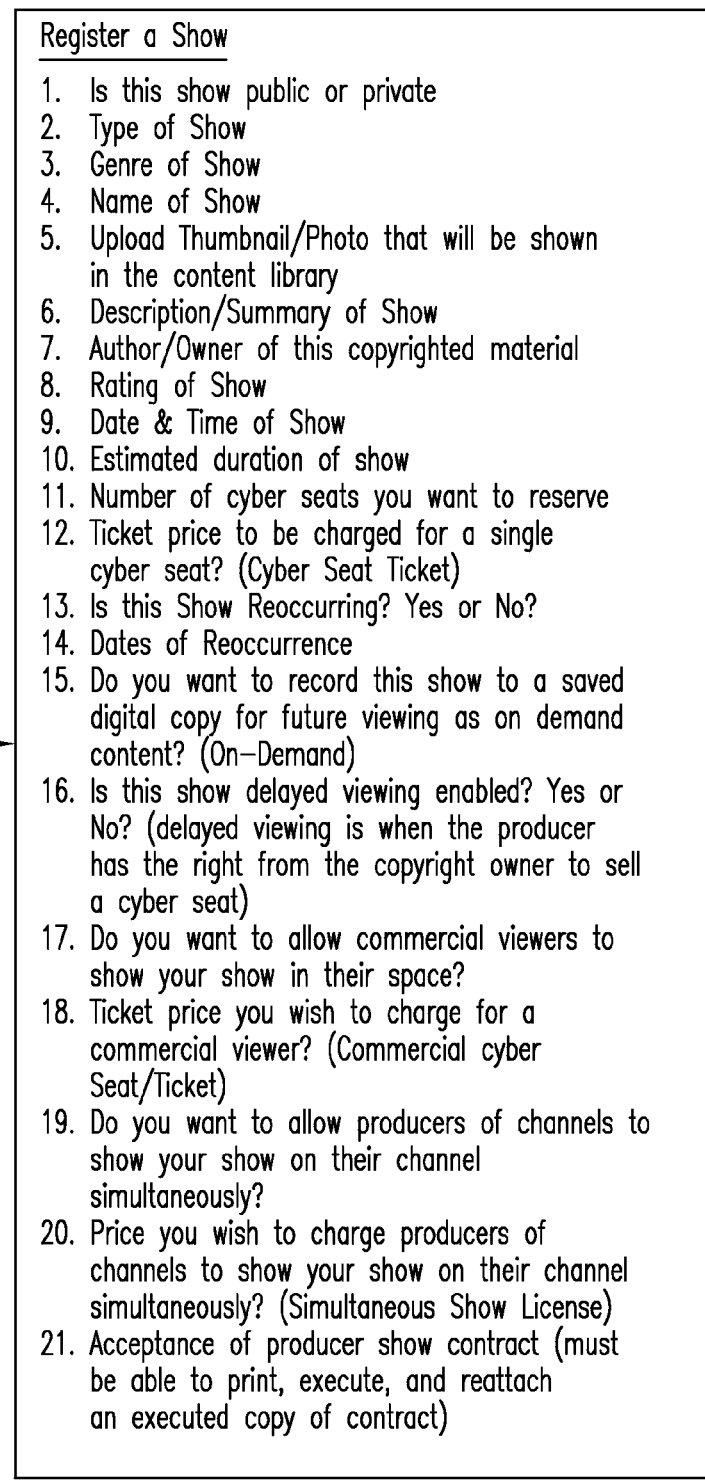
FIG.3C

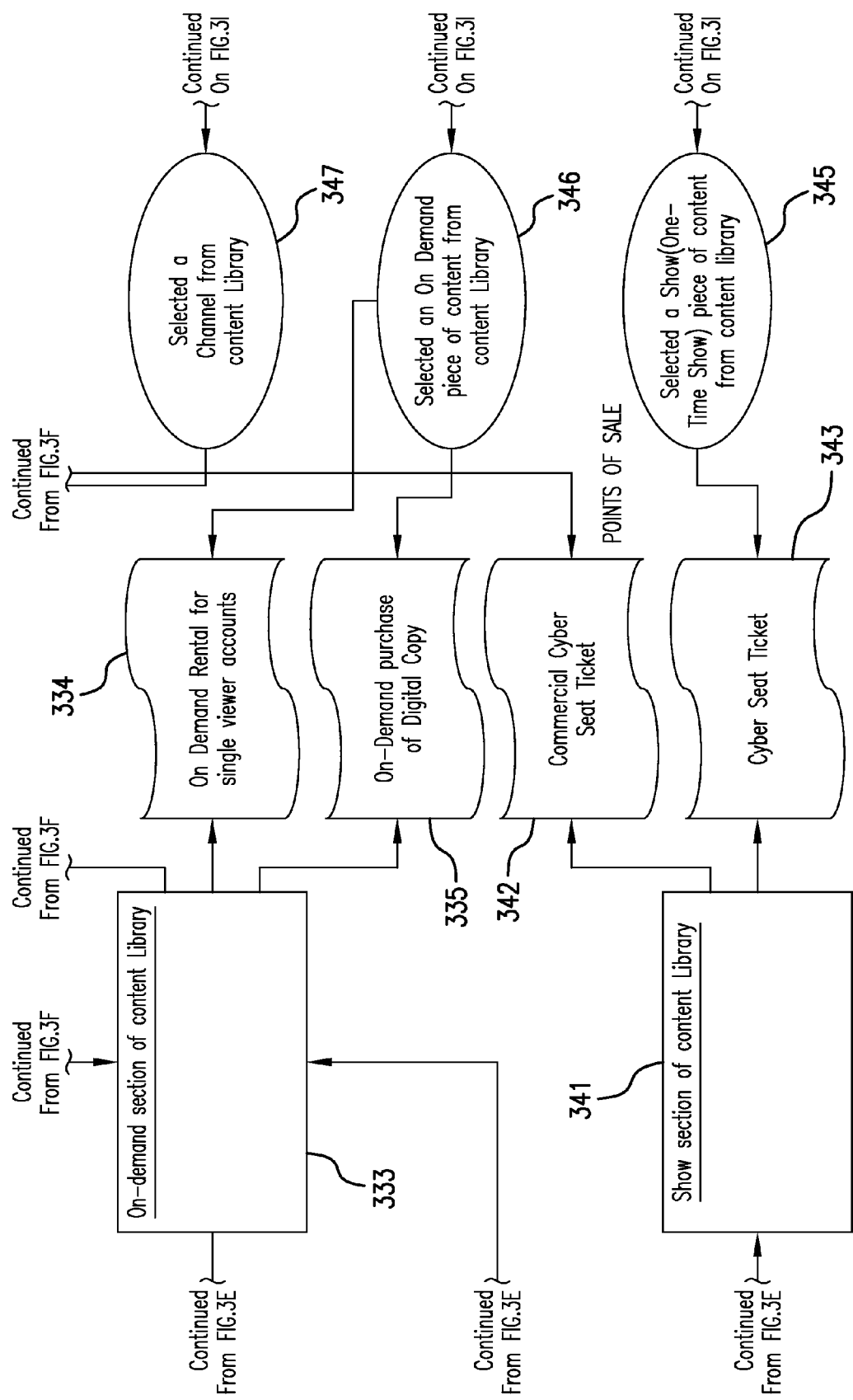

TILTED GLOBE

CREATE EVENT DATA

SHOW NAME — 1601
Jones is Asleep

TYPE — 1602
Concert

GENRE — 1603
Alternative Music

ENTER A DESCRIPTION — 1606

SHOW RATING — 1604
G    View Guidelines

ESTIMATED DURATION
mins — 1605

Using 0 of 275 possible characters.

SHOW DATE/TIME
12/12/15 7:00PM CST   CANCEL — 1607

THUMBNAIL

+ UPLOAD THUMBNAIL — 1608

PLAYBILL  playbill10223.pdf  BROWSE

CANCEL           UPDATE LISTING — 1609

Figure 17:
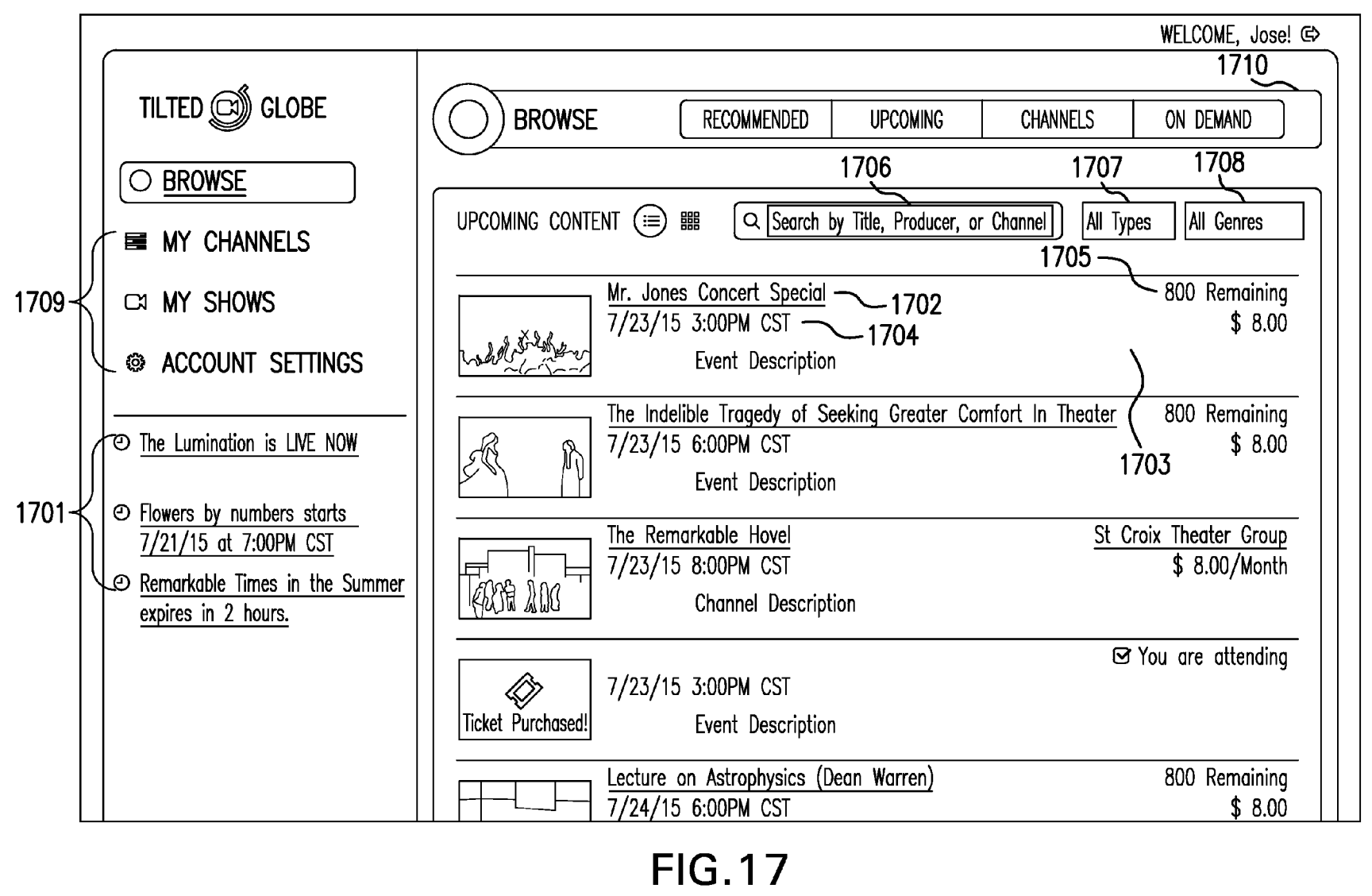

TILTED ⊕ GLOBE

- ○ BROWSE
- ▦ MY CHANNELS
- ▭ MY SHOWS
- ⚙ ACCOUNT SETTINGS

1709 {
- ⊕ The Lumination is LIVE NOW
- ⊕ Flowers by numbers starts
  7/21/15 at 7:00PM CST
- ⊕ Remarkable Times in the Summer
  expires in 2 hours.
}  ← 1701

○ BROWSE

| RECOMMENDED | UPCOMING | CHANNELS | ON DEMAND |

1706 ↑    1707 ↑    1708 ↑

🔍 Search by Title, Producer, or Channel    All Types    All Genres

UPCOMING CONTENT ⋮⋮⋮

Mr. Jones Concert Special ── 1702
7/23/15 3:00PM CST ── 1704
Event Description
800 Remaining
$ 8.00

The Indelible Tragedy of Seeking Greater Comfort In Theater
7/23/15 6:00PM CST    1705    1703
Event Description
800 Remaining
$ 8.00

The Remarkable Hovel
7/23/15 8:00PM CST
Channel Description
St Croix Theater Group
$ 8.00/Month 🎟 Ticket Purchased!
7/23/15 3:00PM CST
Event Description
☑ You are attending Lecture on Astrophysics (Dean Warren)
7/24/15 6:00PM CST
800 Remaining
$ 8.00

WELCOME, Jose! ⊕ ── 1710

SYSTEM FOR ENABLING A VIRTUAL THEATER

CROSS-REFERENCE

The present application claims priority to U.S. Provisional Patent Application No. 62/021,116, filed on Jul. 5, 2014.

FIELD OF INVENTION

The present invention relates generally to real time streaming, and specifically, a system for managing bandwidth based on cyberseats.

BACKGROUND

Attempts to display media on computers date back to the earliest days of computing. However, little progress was made for several decades, primarily due to the high cost, limited capabilities, and to a lesser extent, compatibilities of available computer hardware. Recently consumer-grade personal computers have become powerful enough to display various types of media, including high quality audio and/or video. Streaming multimedia represents one method of media distribution on the Internet. In essence streaming multimedia is multimedia that is broadcast by a streaming provider to an end-user. Generally, the term streaming refers to the delivery method of the data rather than to the content. Unfortunately, streaming typically requires tremendous bandwidth and/or latency to cache the data locally. Recent advances in computer networks, combined with powerful home computers and modern operating systems, have made the nearly universal distribution of streaming media for ordinary consumers possible, practical and affordable. Universal distribution may be defined as multimedia that is constantly received by, and normally presented to, an end-user while it is being delivered by a streaming provider. A stream of media can be provided on-demand or live. On demand streams may be defined as recordings of original productions in media data files stored on a server. They may be stored for a period of time post original production of the data, not necessarily the result of a real time live event, and may be available for transmission at any time upon request. Live streams may be defined as contemporaneous streams of media data relayed from a producer of a performance to a consumer-user as a result of a consumer user request prior to or as the event is taking place. Live streams may still use a server to broadcast the event, and are typically only available at the time the event is occurring unless recorded and converted to on-demand content. An example would be a live theatrical performance.

The current streaming technology for streaming live events entails the use of tremendous bandwidth and/or latency to cache the data. In light of this, there is a need in the art for a bandwidth management system that can be used to make live streaming practical and affordable, for example in connection with a virtual theater.

SUMMARY

The following summary provides a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

In one aspect, the present disclosure describes a system that can be used by a producer of events and shows to create a library or offering profile of events/shows, either recorded or live, and for single viewers or commercial viewers to purchase, stream, and view these events/shows on multiple devices and platforms. A producer may live stream and/or record events/shows from multiple locations separately or concurrently and allow servers to compress and transmit the media data to reach viewers that have purchased access to the events/shows. Each single or commercial viewer is said to have purchased a "cyberseat" or "cyber ticket".

In another aspect, the present disclosure describes a system that has the capability, prior to the streaming of the event/show, to calculate required bandwidth and generate rates and costs to stream multiple events/shows or channels to viewers, including commercial establishments, for viewing on various devices and platforms. A producer may generate a profile for an event/show including information such as the duration of the show and the number of cyber tickets or cyberseats available for the event/show. The system servers generate the base required bandwidth dimension of the producer's cyberseat and generates calculations such as the base ticket prices and production costs relating to the required bandwidth rate needed for that specific event(s)/show(s).

In yet another aspect, the present disclosure describes a system that creates cyber tickets or cyberseats that may be purchased by individual viewers or commercial establishments. The system calculates the costs and pricing of cyberseats to one or more events/shows based on a producer's event/show profile and the bandwidth costs related to that event/show cyberseat. Prior to the production of a show/event the producer will know the production costs related to a single cyberseat and based upon his or her revenue goal, utilize the capabilities of the disclosed system to create a cyberseat price available for purchase to viewers. In addition, the producer will know the number of cyberseats reserved and may be able to determine any copyright royalties due.

Still other aspects of the disclosed innovation will become readily apparent to those skilled in this art from the following description wherein there is shown and described example embodiments of this innovation, simply by way of illustration of the best modes suited to carry out the invention. The innovation is capable of implementation in other different embodiments, and its several details are capable of modifications in various obvious aspects, all without departing from the true spirit and scope of the invention. Accordingly, the drawings and detailed descriptions will be regarded as illustrative in nature and not as unnecessarily restrictive, unless expressly stated otherwise.

BRIEF DESCRIPTION OF THE DRAWINGS

Various exemplary embodiments of this invention will be described in detail, with reference to the following figures, wherein:

FIGS. 3A-3J illustrate a flow chart of an embodiment of the event streaming system including a description of user experiences for different types of users of the site, site layout and basic site design.

FIG. 16 is a sample illustration of a create and/or edit event data form in accordance with one embodiment.

FIG. 17 is a sample illustration of a viewer's homepage in accordance with one embodiment.

DETAILED DESCRIPTION OF ILLUSTRATIVE EMBODIMENTS

Figure 1:
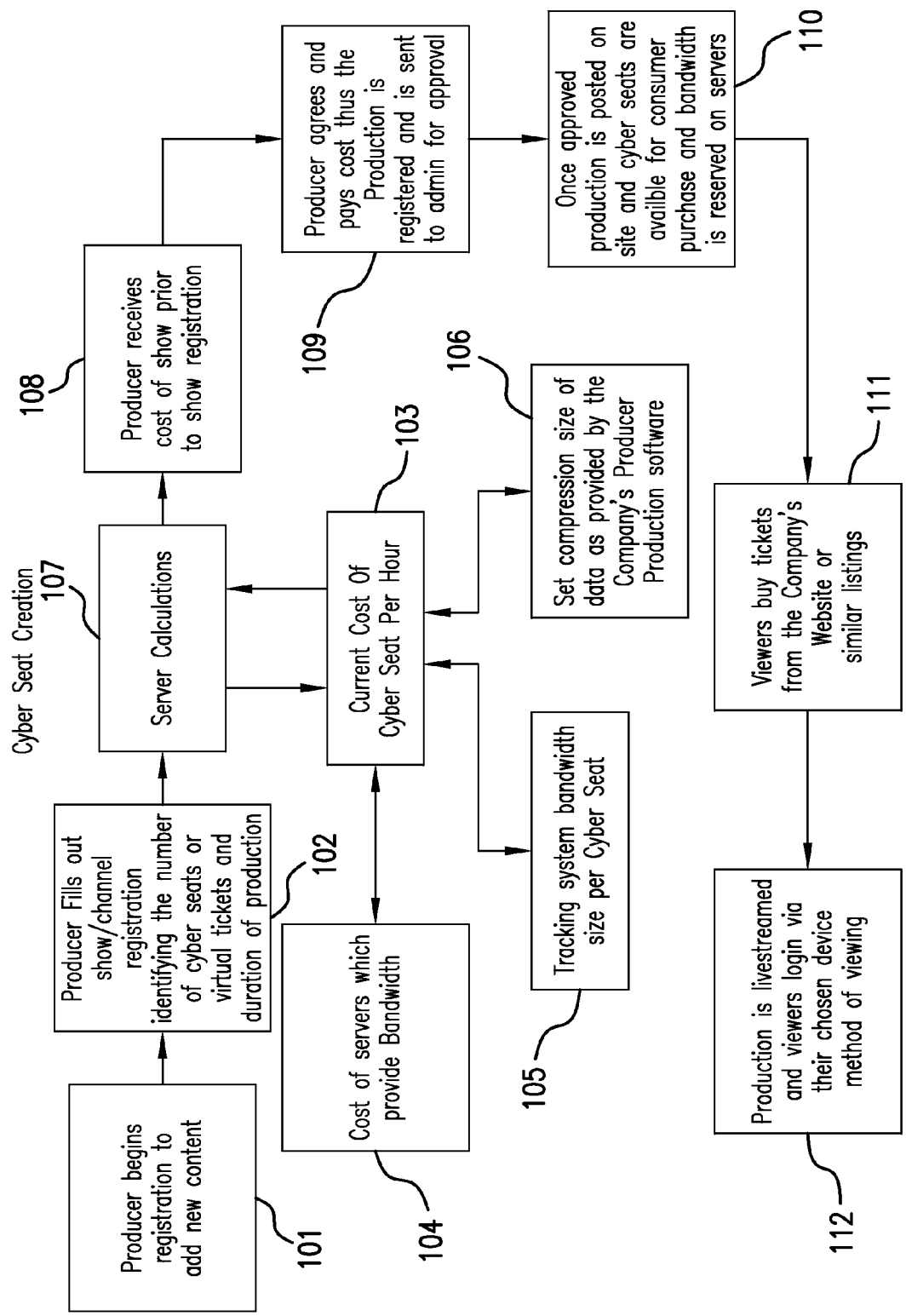
FIG. 1 is a block diagram of an embodiment of the event streaming bandwidth calculation system which may express the aspects of bandwidth management, computation of bandwidth requirements for each cyberseat, and how the bandwidth requirements per cyberseat are obtained either manually or automatically prior to the booking of an event.

The claimed subject matter is now described with reference to the drawings. In the following description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention and the claims.

As used herein, an element or step recited in the singular and proceeded with the word "a" or "an" should be understood as not excluding plural of said elements or steps, unless such exclusion is explicitly stated. In this document, the term "or" is used to refer to a nonexclusive or, unless otherwise indicated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In the following detailed description, reference is made to drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that structural, logical, and electrical variations may be made without departing from the scope of the subject matter disclosed herein. The following detailed description is, therefore, not to be taken in a limiting sense.

As will be appreciated by those skilled in the art, portions of the present disclosure may be embodied as a method, data processing system, or computer program product. Accordingly, these portions of the present disclosure may take the form of an entirely hardware embodiment, an entirely software embodiment, or an embodiment combining software and hardware aspects. Furthermore, portions of the present disclosure may be implemented as a computer program product on a computer-usable storage medium having computer readable program code on the medium. Any suitable computer readable medium may be utilized including, but not limited to, static and dynamic storage devices, hard disks, optical storage devices, and magnetic storage devices.

The present innovation is described below with reference to illustrations of methods, systems, and computer program products according to embodiments of the invention. It will be understood that blocks of the illustrations, and combinations of blocks in the illustrations, can be implemented by computer program instructions, hardware devices, or a combination of both. These computer program instructions may be provided to a processor of a general purpose computer, special purpose computer, or other programmable data processing apparatus to produce a particular machine, such that the instructions, which execute via the processor of the computer or other programmable data processing apparatus, implement the functions specified in the block or blocks.

Embodiments of present innovation may be implemented on one or more computing devices, including one or more servers, one or more client terminals, including computer terminals, a combination thereof, or on any of the myriad of computing devices currently known in the art, including without limitation, personal computers, laptops, notebooks, tablet computers, touch pads (such as the Apple iPad, SmartPad Android tablet, etc.), multi-touch devices, smart phones, personal digital assistants, other multi-function devices, stand-alone kiosks, etc.

The various embodiments and/or components, for example, the modules, elements, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as an optical disk drive, solid state disk drive (e.g., flash RAM), and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), field-programmable gate arrays (FPGAs), graphical processing units (GPUs), logic circuits, and any other circuit or processor capable of executing the functions described herein. The above examples are exemplary only, and are thus not intended to limit in any way the definition and/or meaning of the term "computer."

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program, which may form part of a tangible non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software", "firmware" and "algorithm" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

FIG. 1 illustrates one embodiment of a process for the creation of a cyberseat. In step 101 a producer user initiates the registration process to add content to the site. This may be accomplished by a producer user selecting a link (for example, FIG. 8) on the site that enables the addition of content. In step 102, the producer fills out a registration form (for example, FIGS. 9, 10, 14) to add content to the site that may require the number of cyberseats he wishes to reserve for a particular live event, the show time for the live production livestream, and the expected duration of the production in accordance with one embodiment. To provide a point of comparison, a producer may rent an entire theater with a fixed number of seats, hire an artist to perform at the theater, and be responsible for advertising and selling all seats in order to maximize a profit. With respect to the present disclosure, the producer is able to adjust the number of seats for a performance in the virtual theater at any time he or she deems necessary.

In step 103, the server may calculate the current cost of a specific increment of bandwidth for a specific increment of time for a cyberseat by multiplying the monetary value of bandwidth in a specific increment of time (step 104) by the standard bandwidth size of a cyberseat as provided by the bandwidth tracking system (step 105) or by the compression size of data as set by the production software (step 106) or by a combination of steps 105 and 106.

In step 104, the server may acknowledge a monetary value for bandwidth in a specific increment of time as it is derived from the bandwidth providing server's cost of operation.

In step 105, the server may track and measure actual bandwidth usage throughout use of the disclosed system for the cyberseat providing a standard size of a cyberseat in terms of amount of bandwidth per a specific amount of time.

In step 106, the server may acknowledge the compression size of data set by the company (e.g., provider of streaming service) as configured in the production software providing a size of bandwidth per a cyberseat per a specific amount of time.

Figure 10:
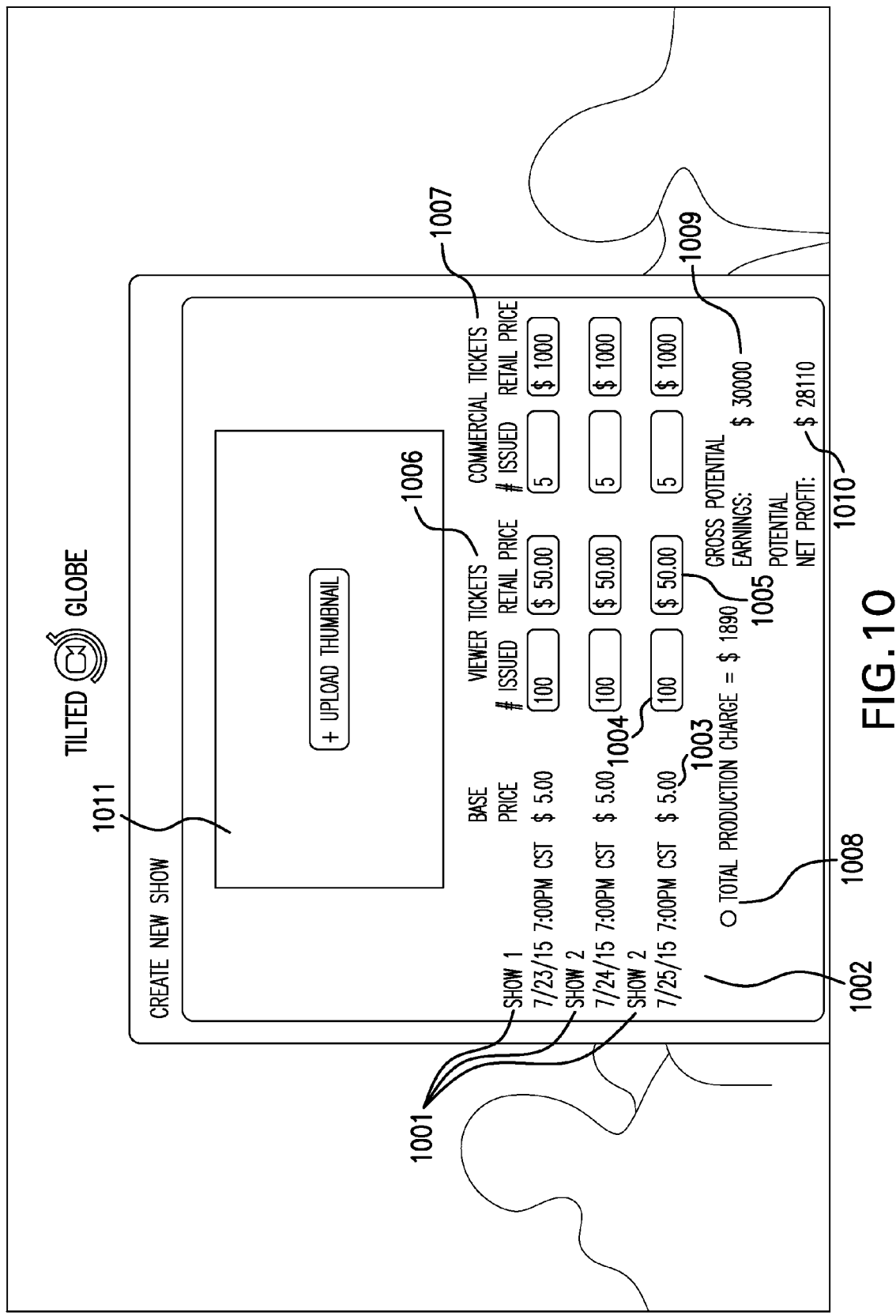
FIG. 10 is a sample illustration of a "create new show" form and cyberseat price calculations in accordance with one embodiment.

In step 107, the server may calculate the amount of required bandwidth that may be needed for a production by multiplying the cost of a specific increment of bandwidth for a specific increment of time for a cyberseat calculated in step 103 by the number of cyberseats and the expected amount of time for the production that the producer stated in step 102 and may provide the producer of the production the cost of the required bandwidth in step 108 (as illustrated in FIG. 10) in accordance with one embodiment.

In step 108 the Producer may receive the cost of how much it would cost for the Producer to reserve a specific number of cyber seats for the length of the content/production that they wish to show (for example, FIG. 10). In step 109 the Producer agrees and pays the cost of reserving the number of cyber seats for the length of the content/production that they wish to show and their content registration is sent for approval by the service provider administrator. In step 110, once the Producer's content registration is approved, then the cyber seats become available for purchase by viewer users.

In step 111, viewers may buy tickets from the entity's website (e.g., service provider) or a similar listing. In step 112, on the date of production the producer livestreams the production/event through use of the Producer's production software and viewers may view the livestream via their chosen device or method of viewing in accordance with one embodiment.

In accordance with one embodiment, the system will know in advance the total number of cyberseats purchased for all events to be streamed and may adjust bandwidth management requirements and compression accordingly.

Figure 2:
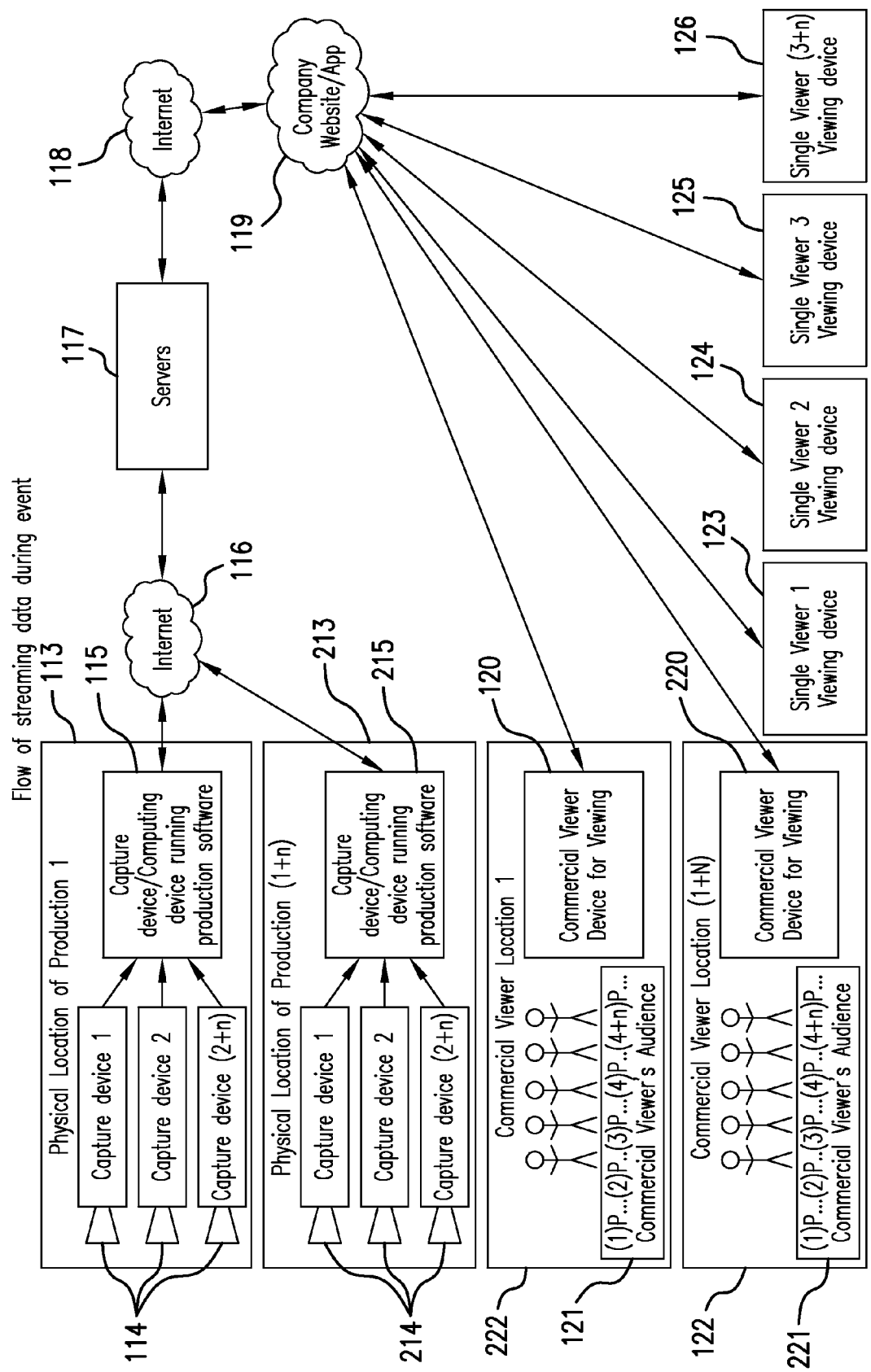
FIG. 2 is a block diagram of an embodiment of the event streaming system including real time streaming of events/shows from multiple devices to multiple devices and expresses the flow of media data streams.
Figure 3A:
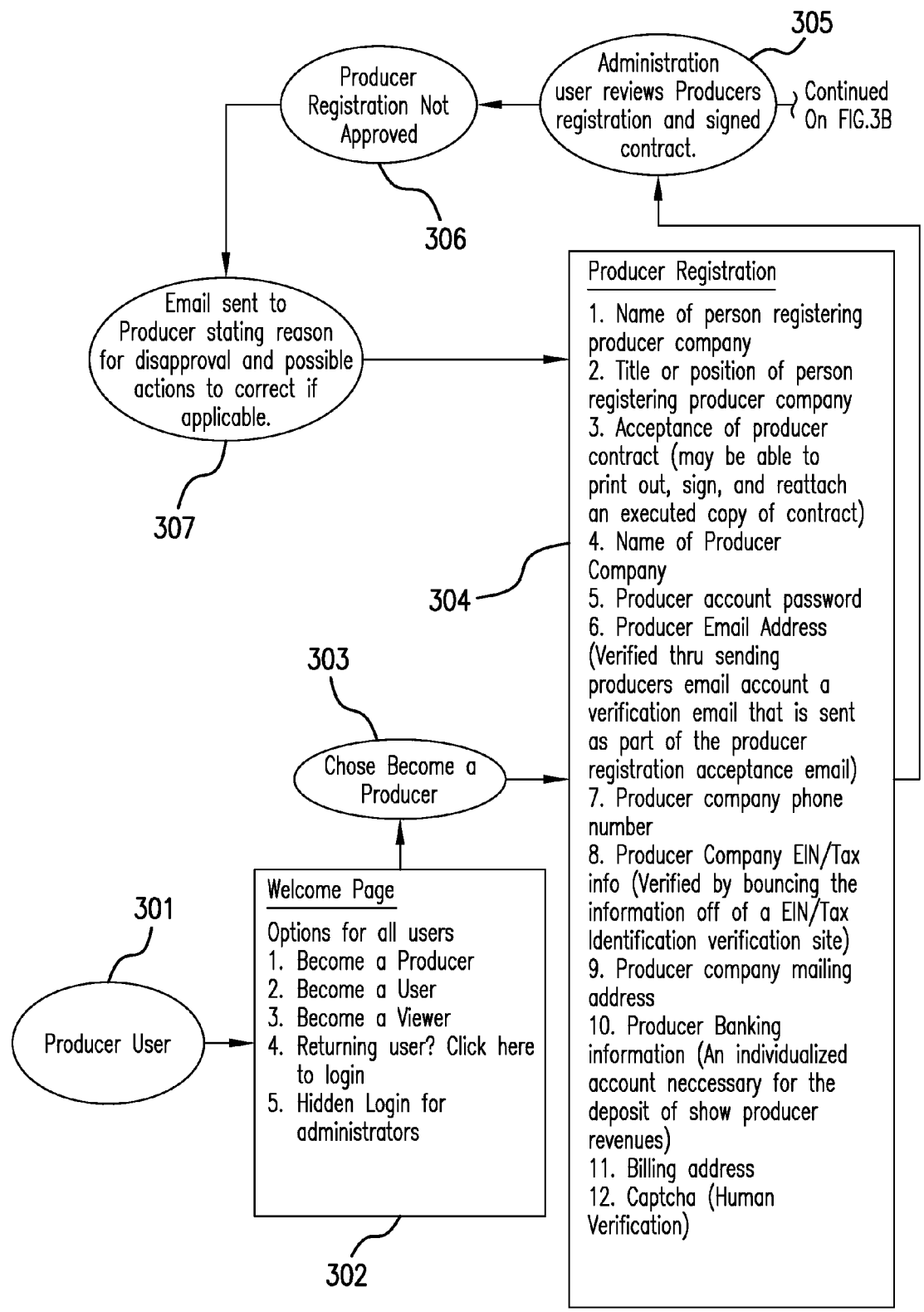
Figure 3B:
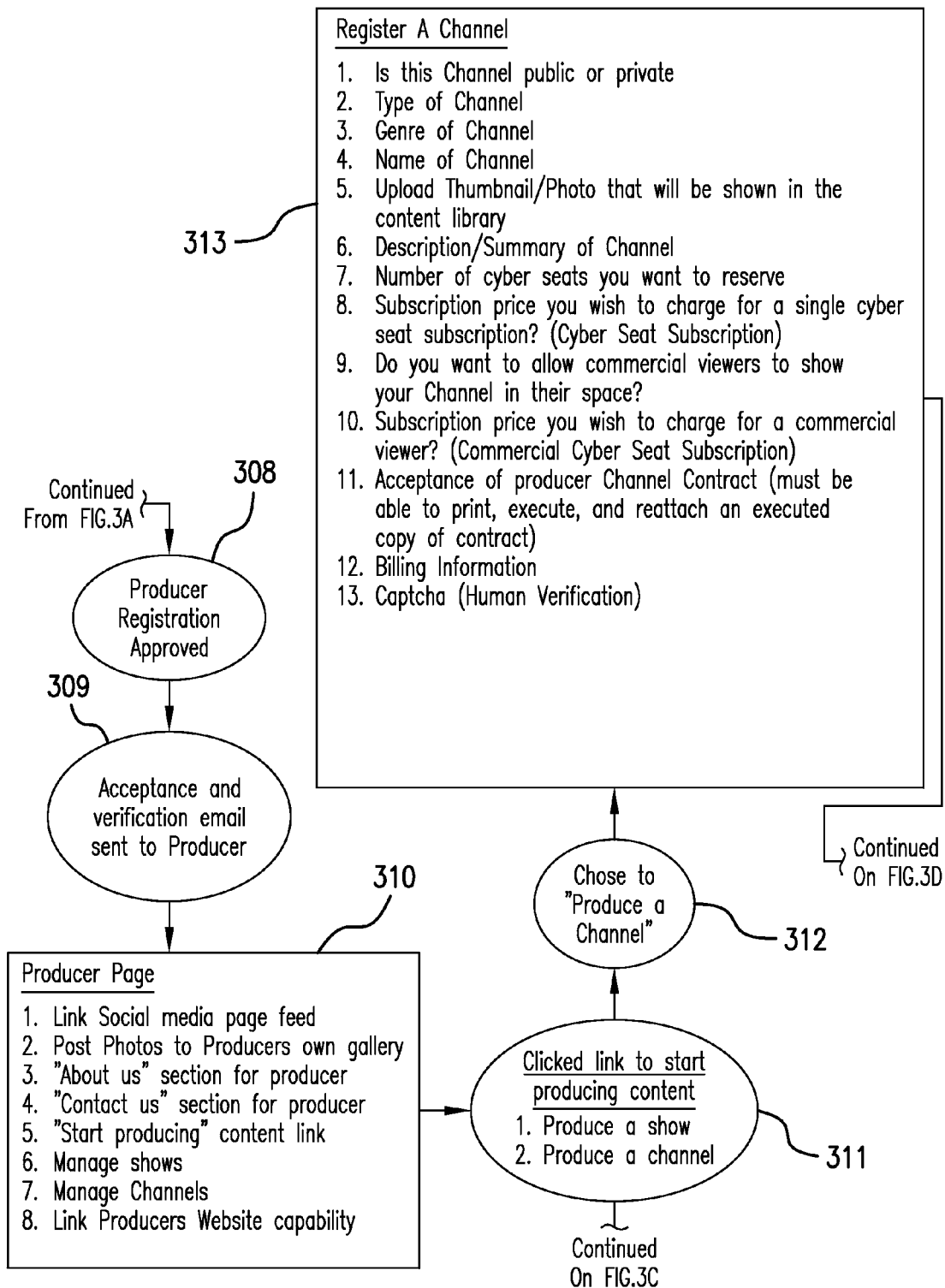
Figure 3D:
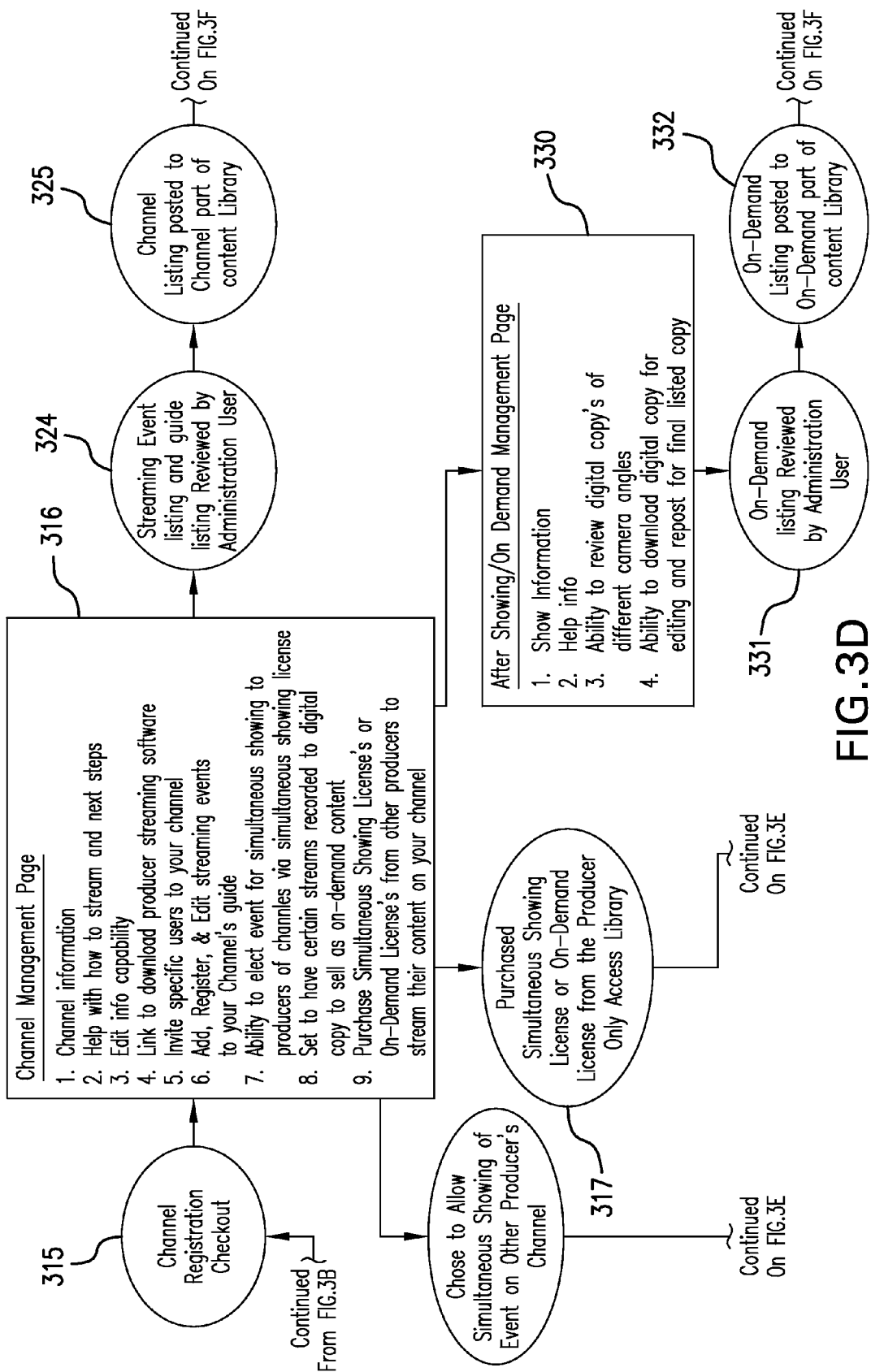
Figure 3E:
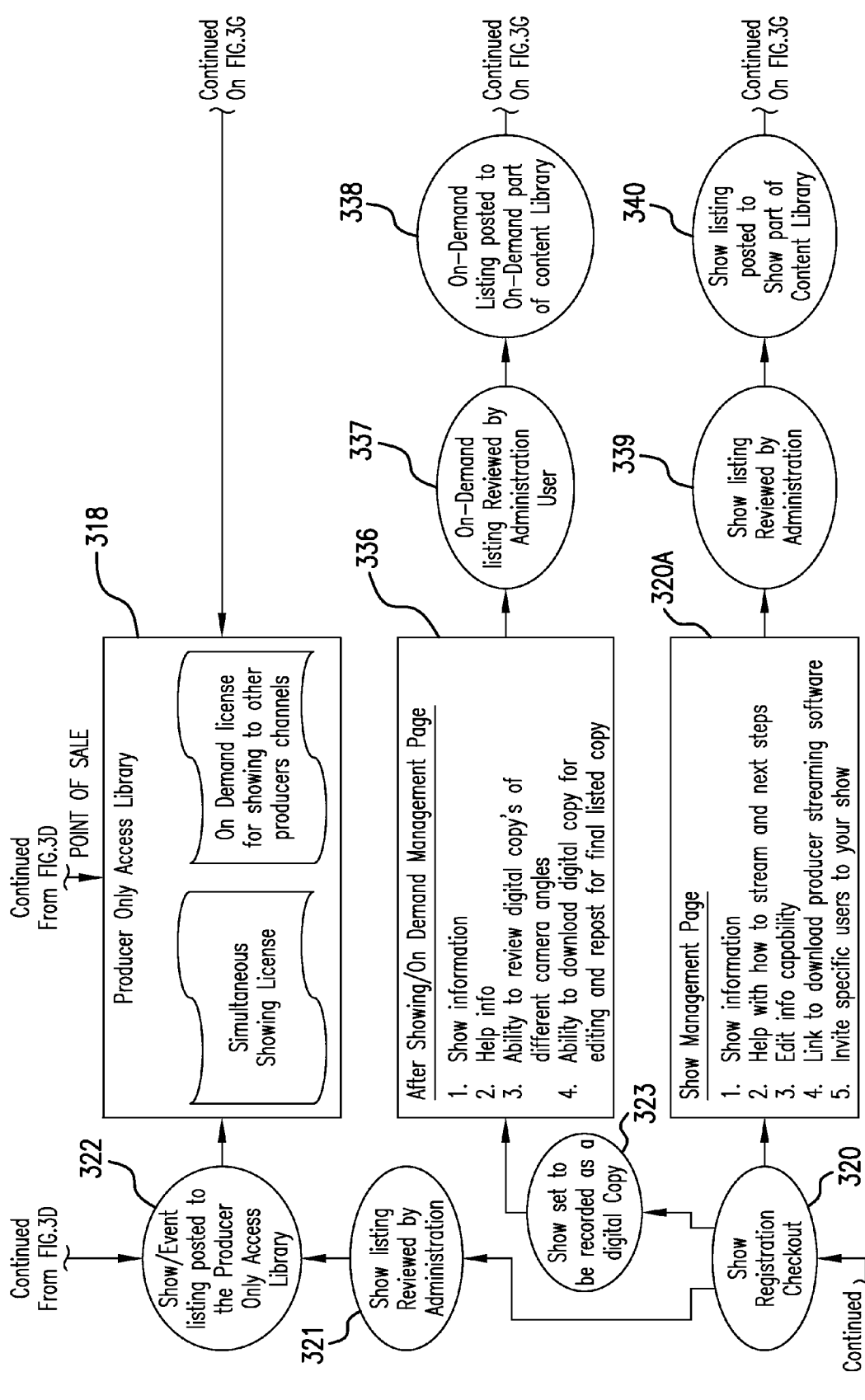
Figure 3F:
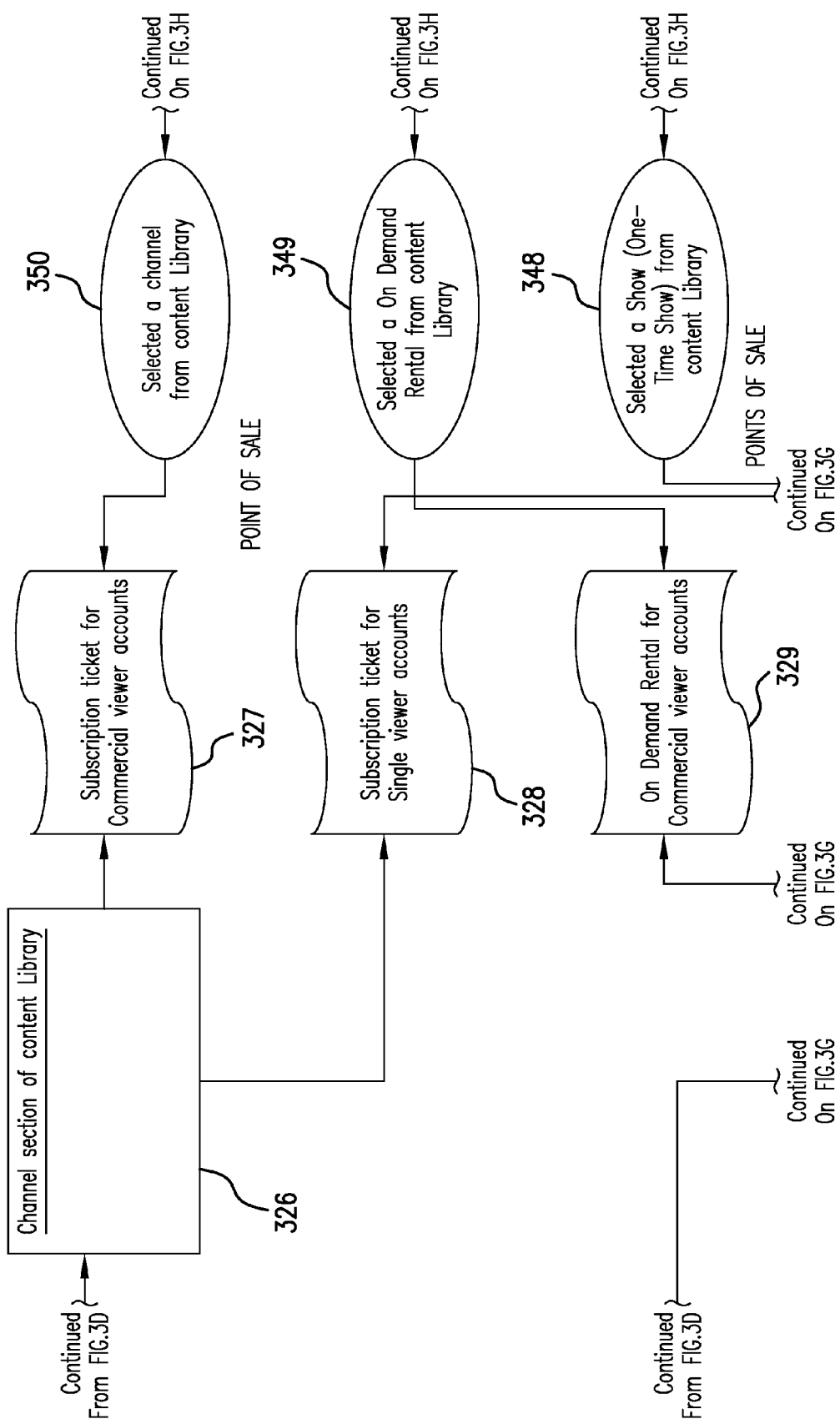
Figure 3H:
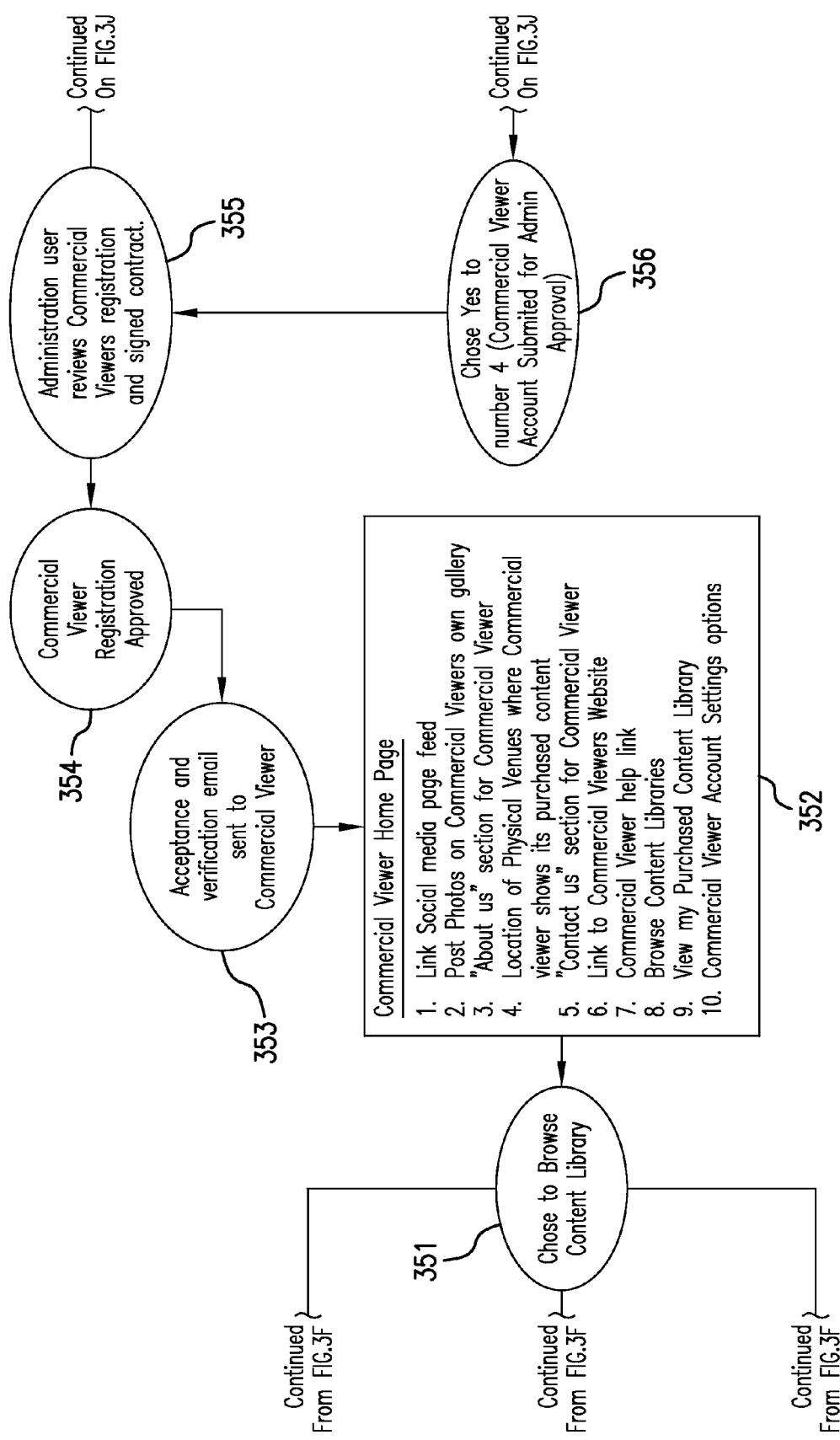
Figure 3I:
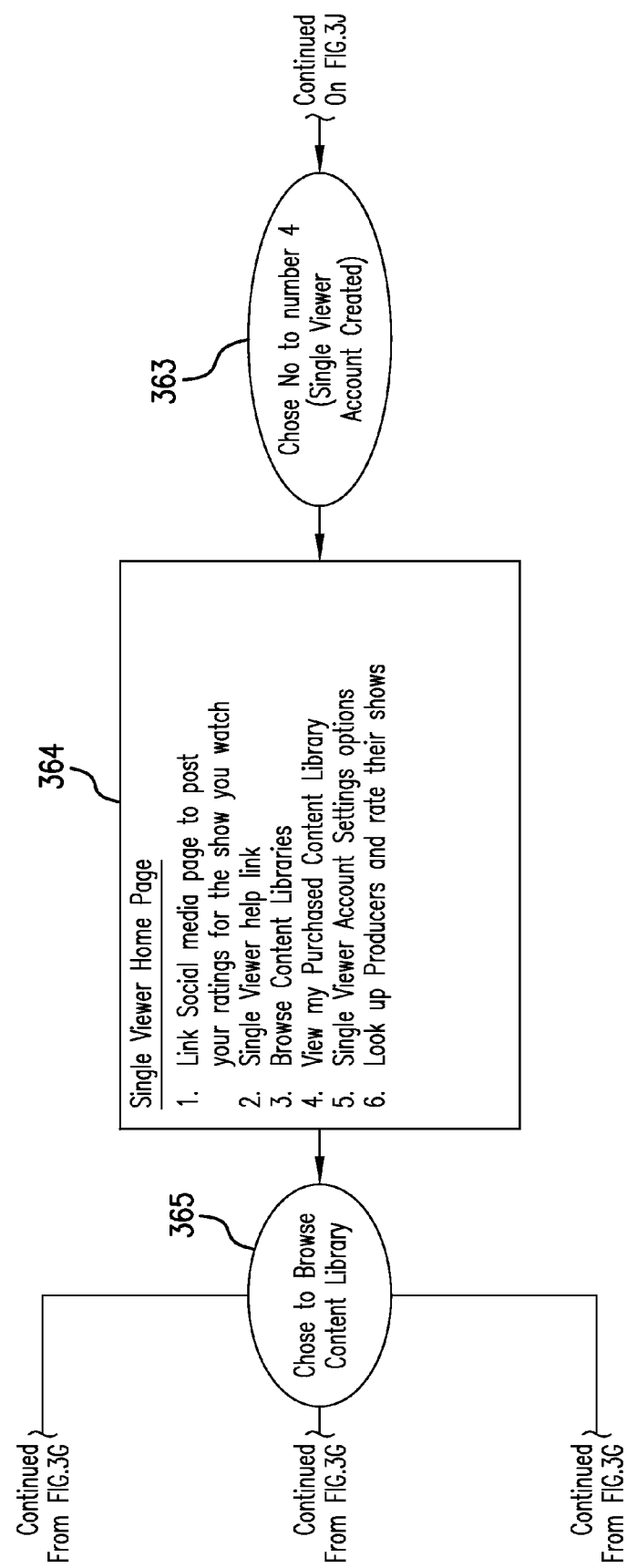
Figure 3J:
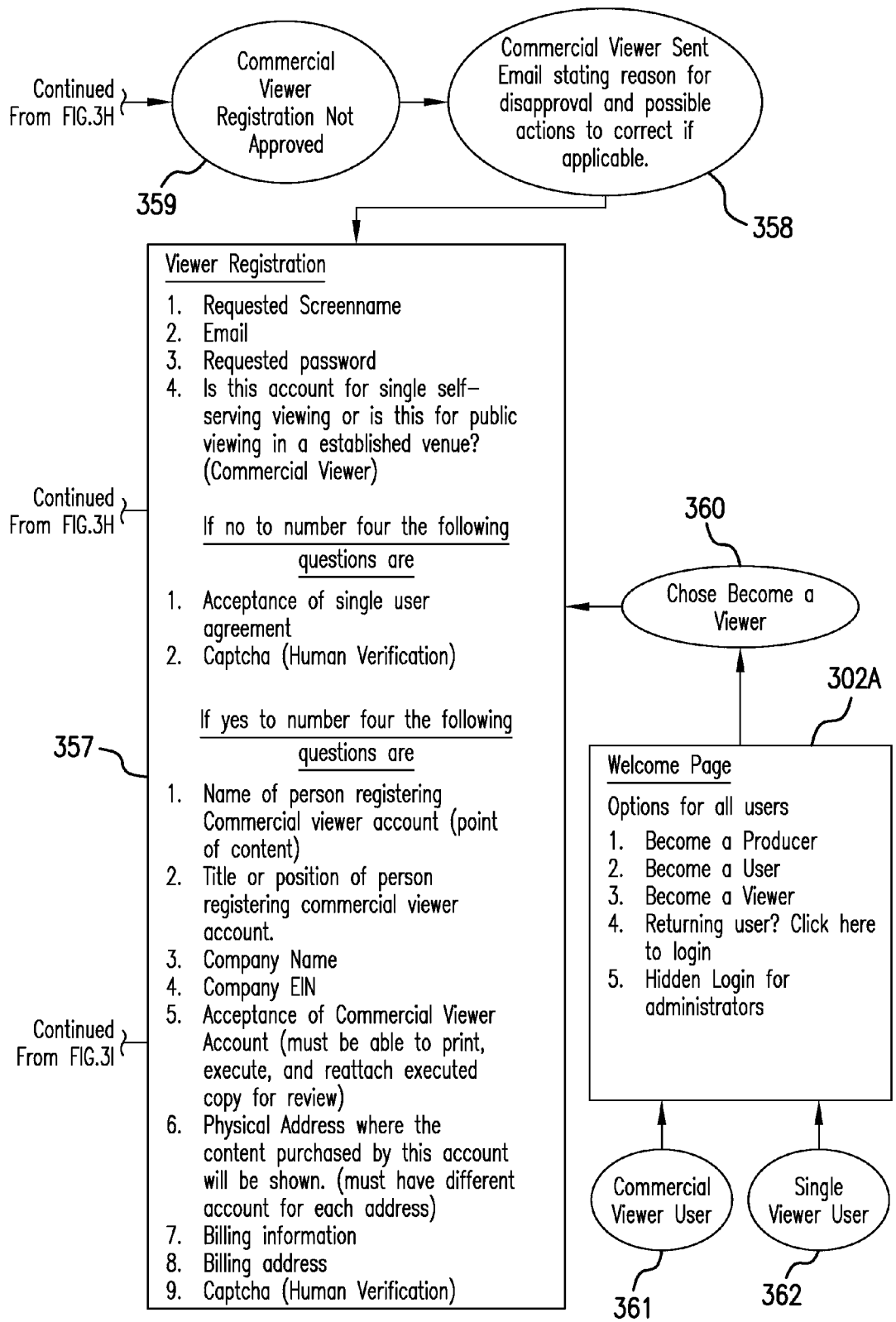

FIG. 2 illustrates the flow of streaming data during an event in accordance with one embodiment. Numeral 113 represents the physical location where the production is taking place and being captured into video and audio data. Numeral 114 represents capture devices into which the video and audio may be captured and converted into data streams. Numeral 115 represents a device running production software. This device may receive the video and audio from the capture devices (Numeral 114), compresses it, and transmits the compressed data to the service provider's servers (Numeral 117) via the Internet (Numeral 116). This process can take place simultaneously as shown by Numerals 213-215.

Numeral 117 represents servers which may be implemented as content management servers. The servers may process the event data by applying compression and/or encoding algorithms to the event data before downstreaming the data to the remote devices as shown by Numerals 120, 220 and 123-126. For example, the server can know in advance how many cyberseats have been purchased and adjust the reserved bandwidth in accordance with the number of purchased cyberseats. The bandwidth may also be calculated based on the device with the maximum streaming rate required to accommodate any rate needed in any device in any location for any type of streaming content (e.g., a mobile device in motion viewing a high impact motion streamed content). Additionally or alternatively, the server can also reserve additional bandwidth if other events are to be downstreamed simultaneously (e.g., from venue Numeral 213).

Numeral 117 represents servers which may receive the compressed video and audio data from all productions, duplicate the data streams, and distribute them out to commercial or single viewers who have purchased cyberseats. The cyberseats may be purchased via the Internet (Numeral 118) and the service provider's website and/or app, or viewing software/hardware (Numeral 119). Numeral 119 represents the service provider's website/App/Software/hardware which viewers, either single or commercial, use/access via their device to view the video and audio data stream which they have pre-purchased. In some implementations, the server (Numeral 117) reserves bandwidth for streaming out the compressed data stream to the one or more viewing devices based on a number of capture devices (Numeral 114).

Numeral 122 represents a first commercial viewing location (Numeral 222 represents a second commercial location) where commercial viewers can view the live streamed production, which they purchased access to. Numeral 120 represents the Commercial Viewer device(s) associated with a cyberseat(s) for viewing the streamed event or show. This may be any device which can access the Internet either directly or via Native App/software/hardware (e.g., laptops, augmented reality system, TVs, phones, personal or commercial computing devices).

Numerals 123-126 represent single viewer viewing devices with which single viewers (e.g., single families) may use to view live data streams. This device may be any device that can access the Internet, either directly or via Company App/software (e.g., laptops, augmented reality systems, TVs, phones, personal computing devices, etc.).

FIGS. 3A-J illustrate a flow chart in accordance with one embodiment of the event streaming system which includes user experiences for different types of users of the site, site layout and an embodiment of basic site design. Numeral 301 represents a producer user entering the site. Numeral 302 represents the site welcome page where the system may allow a producer user (Numeral 301) to access a welcome page via the Internet and may allow a producer user (Numeral 301) the ability to login or register on the site. Numeral 303 represents the producer user (Numeral 301) having chosen the option on the Welcome Page (Numeral 302) to become a producer on the site. Numeral 304 represents the producer user (Numeral 301) being directed to the Producer Registration as a result of the Producer User (Numeral 301) action on the Welcome Page (Numeral 302). Numeral 304 represents the Producer registration where the individual person performing the physical action of as, for or on behalf of producer user (Numeral 301) may be required to input information for producer registration which may include but is not limited to the (i) individual person's given name; (ii) individual person's title or position within the organization of the producer user (Numeral 301); (ii) producer user's (Numeral 301) acceptance of producer contract (producer may be able to print out and reattach a executed copy of contract); (iv) full legal name of producer user's (Numeral 301) company; (v) creation of producer user (Numeral 301) account password; (vi) verification process of producer user's (Numeral 301) email address (may be verified by sending the producer user's (Numeral 301) email account a verification email); (vii) providing producer user (Numeral 301) company phone number; (viii) providing producer user (Numeral 301) company EIN/tax identification information (may be verified using a tax identification number database); (ix) providing producer user (Numeral 301) company mailing address; (x) providing producer user (Numeral 301) banking information (an individualized account that may be used for deposit of a producer user (Numeral 301) show/channel revenues); (xi) providing producer user's (Numeral 301) billing address; and (xii) a producer user (Numeral 301) successfully completing a captcha task (human verification). Numeral 305 represents the site administration user's review of the producer user's (Numeral 301) registration submission including a copy of the signed contract. Numeral 306 represents a disapproval by the administration user review process (Numeral 305) of the producer user's registration (Numeral 304). Numeral 307 represents the disapproval email transmission automatically and/or manually generated by the site and/or the administration user which email may provide possible corrective actions to be taken by the producer user (Numeral 301). Should the email transmission provide corrective actions necessary for a producer registration (Numeral 304) approval then the producer user (Numeral 301) will be redirected back to the producer registration (Numeral 304) for resubmission of the corrected information. Numeral 308 represents a producer registration approval after producer registration (Numeral 304) is submitted to the site administration user's review of the producer user's registration submission including a copy of the signed contract (Numeral 305). Numeral 309 represents the acceptance and verification email transmission automatically and/or manually generated by the site and/or the administration user to the producer user (Numeral 301). Numeral 310 represents the producer user's (Numeral 301) individualized producer page which may include items such as: (i) link social media page feed; (ii) post photos to producers own gallery; (iii) "about us" section for producer; (iv) "contact us" section for producer; (v) "start producing" content link; (vi) manage shows; (vii) manage channels; and (viii) link producers website capabilities. Numeral 311 represents the producer user's link to begin producing content and may be made by the producer choosing to produce a show and/or channel. Numeral 312 represents a producer user (Numeral 301) who chose to produce a channel. Numeral 313 represents a producer user's channel registration which may include but is not limited to submission of information for (i) designation of the channel as public or private; (ii) type of channel (i.e. multi-type, theatrical, music, sports, education, conference, spiritual, theological, etc. . . . ); (iii) genre of channel (music genres may include multi-genre, classical, rock, country, etc., and theatrical genres may include classical, horror, comedy, romance, etc.); (iv) name of channel; (v) thumbnail/photo upload that may be shown in content library; (vi) description/summary of channel; (vii) number of cyberseats a producer user (Numeral 301) may desire to reserve; (viii) a cyberseat subscription price for an individual viewer as may be determined by a producer user (Numeral 301); (ix) a producer user (Numeral 301) election to provide commercial viewer subscriptions to a channel if so desired; (x) a commercial viewer cyberseat subscription price should the producer user (Numeral 301) elect to provide commercial viewers access to the channel; (xi)

producer user (Numeral 301) acceptance of producer channel contract (with the option to print, execute, and reattach an executed copy of contract) to site during this registration process; (xii) producer user (Numeral 301) billing information; and (xiii) producer user (Numeral 301) successful captcha (human verification). Numeral 315 represents the producer user (Numeral 301) Channel Registration Checkout. Upon inputting the number of cyberseats (viewer and commercial) and the expected amount of streaming per month then the system calculates the cost of reserving the channel (see FIG. 1 and FIG. 5). A producer user may then submit the channel registration which may be reviewed by an administration user for approval if necessary. Upon approval of channel a producer may be charged the cost of reserving the channel during Channel Registration Checkout (Numeral 315). A channel may appear for purchase by viewers in the channel section content library (Numeral 326) if not previously listed. A producer user (Numeral 301) may be allowed access to a channel management page if not previously given access (Numeral 315). Numeral 316 represent the producer user (Numeral 301) Channel Management Page where pertinent information relating to the producer user's (Numeral 301) specific channel may be provided but not limited to (i) Channel information; (ii) information and instructions for the producer user (Numeral 301) to successfully stream his channel; (iii) provide information for successfully editing producer user information on his channel; (iv) provide link to download producer streaming software; (v) provide tools to the producer user (Numeral 301) allowing invitations to the channel to be extended to specific users; (vi) provide capabilities for producer user (Numeral 301) to add, register and edit streaming events to the specific channel guide; (vii) provide ability to elect event for simultaneous viewing to producers of channels via simultaneous show license; (viii) provide capabilities to allow producer user (Numeral 301) to designate certain streams recorded to digital copy for on-demand content; and (ix) provide capabilities to producer user (Numeral 301) to purchase simultaneous showing licenses and on-demand licenses from other producers in order to stream their content onto the producer user (Numeral 301) channel. Numeral 324 represents the producer user (Numeral 301) submission of a specific channel's streaming event listing and guide listing for review by an administration user which submission originates from the Channel Management Page (Numeral 316). Numeral 325 represents the posting to the channel section of the content library (Numeral 326) of a producer user's channel listing as a result of a producer user's (Numeral 301) submission of event and listing guide (Numeral 324). Numeral 317 represents the action of the producer user (Numeral 301) who may decide to purchase a simultaneous showing license or on-demand license from the producer only content library (Numeral 318). Numeral 318 is the producer only content library which shows content available for a producer to purchase as a simultaneous showing license or an on-demand listing (Numeral 318) where a producer user may browse and purchase another producer's content for streaming on his specific channel. Numeral 330 represents the a producer user (Numeral 301) access to the After Showing/On Demand Management Page which is provided to a producer user (Numeral 301) who chose in the channel management page (Numeral 316) to post a recorded copy of a streamed event to the on-demand library the producer user (Numeral 301). The After Showing/On-Demand Management Page (Numeral 330) allows a producer user (Numeral 301) to post (i) show information; (ii) access helpful information regarding posting of on-demand content to the content library; (iii) provide a producer user (Numeral 301) the ability to review a digital copy from different camera angles; and (iv) provide a producer user (Numeral 301) the ability to edit the copy should the producer user (Numeral 301) so desire prior to posting the final listed copy to the content library. Numeral 331 represents the producer user (301) submission of the on-demand listing and recorded copy which may have been edited, for review by site's administration user for approval if necessary. Numeral 332 represents the administration user's approval of the on-demand content when the content is then posted to the on-demand section of the content library (Numeral 333). Numeral 333 represents the On-Demand section of the content library in which on-demand content is stored, by producers of On-demand content as a result of the producer user's (Numeral 301) submission of On-Demand content listing(s) from show (Numeral 338) or submission of On-Demand content listing(s) from events on a channel (Numeral 332), for purchase of viewers via a rental (Numerals 329 and 334) or purchase of digital copy (Numeral 334). Numeral 351 represents channel listing(s) reviewed by the administration users as a result of the producer user's (Numeral 301) election of a show(s)'s simultaneous/on demand viewing license(s) availability for purchase by a producer user (Number 301) of a channel. Numeral 322 represents the event listing posted to the simultaneous showing license part of the producer only access library (Numeral 318) as a result of the administration user's approval. Number 318 represents the Producer Only Access simultaneous/on demand portion of the content library which reflects shows delivered to site as a result of actions by the producer user (Number 301) show registration (Number 319) and/or by the producer user (Number 301) of a channel at registration of an event at channel management page (Number 316) and is the point of sale for same by user producers (Number 301) if applicable.

Numeral 314 represents the result of the producer user (301) opting to produce a show instead of a channel at the link to produce content (Numeral 311). Numeral 319 represents a producer user's show registration which may include but is not limited to submission by the producer user (Numeral 301) of information for (i) designation of the show as public or private; (ii) type of show (e.g., multi-type, theatrical, music, sports, education, conference, spiritual, theological, etc.); (iii) genre of show (music genres may include multi-genre, classical, rock, country, etc., and theatrical genres may include classical, horror, comedy, romance, etc.); (iv) name of show; (v) thumbnail/photo upload that may be shown in content library; (vi) description/summary of show; (vii) status of content: author/owner of copyrighted material; (viii) rating of show; (ix) date(s) and time(s) of show; (x) estimated duration of show; (xi) number of cyber seats requested to be reserved; (xii) price(s) for show's single cyber seat (Cyber Seat Ticket); (xiii) whether show will hold reoccurrences; (xiv) dates and times of reoccurrences; (xv) election to record a show for future viewing as on demand content (On-Demand Section of the Content Library Numeral 333); (xvi) election to provide show(s) with delayed viewing capabilities (delayed viewing is when the producer user (Numeral 301) is allowed to set a show's parameters so as to allow viewers to initiate viewing of a show from its origination any time after the show began within a defined window of time); (xvii) election to provide commercial viewer cyber seats to a show's performance(s); (xviii) a commercial viewer cyber seat price should the producer user (Numeral 301) elect to provide commercial viewers access to the show; (xix) election to allow producer user (Numeral 301) to make available for streaming on any other producer user (Numeral 301) channel (simultaneous viewing); (xx) set price for simultaneous viewing license for a show(s); (xxi) acceptance of producer show. Numeral 320 represents the producer user (Numeral 301) Show Registration Checkout. Upon inputting the number of cyberseats (viewer and commercial) and the expected duration of show(s) the system calculates the cost of reserving the show(s) (see FIG. 1 and FIG. 4). A producer user may then submit the show(s) registration(s) which may be reviewed by an administration user for approval if necessary. Upon approval of a show(s) a producer user (Numeral 301) may be charged the cost of reserving the show(s) during Show Registration Checkout (Numeral 320). Show(s) may then appear for purchase by viewers in the content library if not previously listed and producer user(s) may be allowed access to a show management page if not previously given access (Numeral 315). Numeral 320A represents the producer user (Numeral 301) Show Management Page where pertinent information relating to the producer user's (Numeral 301) specific show(s) may be provided but not limited to (i) show(s) information; (ii) information and instructions for the producer user (Numeral 301) to successfully stream his show(s); (iii) provide information for successfully editing producer user information on his show(s); (iv) provide link to download producer streaming software; (v) provide tools to the producer user (Numeral 301) allowing invitations to the show to be extended to specific users. Numeral 339 represents the producer user (Numeral 301) submission of a specific show(s)'s listing(s) for review by an administration user which submission originates from the Show Management Page (Numeral 320A). Numeral 340 represents the posting of a producer user's (Numeral 301) show listing(s) to the show section of the content library (Numeral 341). Numeral 341 represents the show section of the content library as a result of the producer user's (Numeral 301) submission of show listing(s) (Numeral 339). Numeral 343 represents the cyber seat ticket for an individual viewer which is the result of a show posted to the show section of the content library as a result of the producer user's (Numeral 301) submission of show listing(s) (Numeral 339). Numeral 342 represents a commercial cyber seat ticket which is the result of a show posted to the show section of the content library as a result of the producer user's (Numeral 301) submission of show listing(s) (Numeral 339). Numeral 323 represents the action by the producer user (Numeral 301) who may decide to set a show(s) for recording as a digital copy. Numeral 336 represents a producer user (Numeral 301) access to the After Showing/On Demand Management Page which is provided to a producer user (Numeral 301) who chose in the show management page (Numeral 320A) to post a recorded copy of a streamed show to the on-demand library set up by the producer user (Numeral 301). Numeral 336 represents the After Showing/On-Demand Management Page which allows a producer user (Numeral 301) to post (i) show information; (ii) access helpful information regarding posting of on-demand content to the content library; (iii) provide a producer user (Numeral 301) the ability to review a digital copy from different camera angles; and (iv) provide a producer user (Numeral 301) the ability to edit the copy should the producer user (Numeral 301) so desire prior to posting the final listed copy to the content library. Numeral 337 represents the result of the producer user (301) submission of the on-demand listing and recorded copy which may have been edited, for review by site's administration user for approval if necessary. Numeral 338 represents the administration user's approval of the on-demand content when the content is then posted to the on-demand section of the content library. Numeral 333 represents a show posting to the on-demand section of the content library as a result of the producer user (Numeral 301) designating a show for on demand posting during the show registration process. Numeral 334 represents the on demand rental for a single viewer which is the result of a show posted to the on demand section of the content library as a result of the producer user's (Numeral 301) submission of show listing(s) (Numeral 324). Numeral 335 represents the on demand purchase of a digital copy of an on demand piece of content which is the result of content posted to the on demand section of the content library as a result of the producer user's (Numeral 301) submission of on demand content (Numeral 337). Numeral 321 represents show listing(s) reviewed by the administration users as a result of the producer user's (Numeral 301) election of a show(s)'s simultaneous/on demand viewing license(s) availability for purchase by a producer user (Number 301) of a channel. Numeral 322 represents the show listing posted to the simultaneous part of the Producer only access Library (Numeral 318) as a result of the administration user's approval. Number 318 represents the Producer Only Access simultaneous/on demand portion of the content library which reflects shows delivered to site as a result of actions by the producer user (Number 301) show registration (Number 319) and/or by the producer user (Number 301) of a channel at registration of an event at channel management page (Number 316) and is the point of sale for same by user producers (Number 301) if applicable.

Numeral 362 represents a single viewer user entering the site. A single viewer may refer to a personal viewer account intended for personal use by an end user. Numeral 361 represents a commercial viewer entering the site. A commercial viewer may refer to a commercial viewer account intended for a commercial user in which an end user is showing the media data streams to public audiences in the commercial user's physical commercial space. Numeral 302A represents the site welcome page where the system may allow a single viewer user (Numeral 362) or a Commercial viewer user (Numeral 361) to access a welcome page via the internet and may allow a single viewer user (Numeral 362) or a commercial viewer user (Numeral 361) the ability to login or register on the site. Numeral 360 represents the single viewer user (Numeral 362) or the Commercial viewer user (Numeral 361) having chosen the option on the Welcome Page (Numeral 302A) to become a viewer. Numeral 357 represents viewer registration for either a single viewer (Numeral 362) or a commercial viewer (Numeral 361). In viewer registration (Numeral 357) a single viewer (Numeral 362) may be required to input information for producer registration which may include but is not limited to (i) requested screenname; (ii) Email address; (iii) requested password; and (iv) whether or not the viewer account to be registered is for single self-serving viewing purposes or is for public viewing in an established venue. When a single viewer's answer to number (iv) is "no" (i.e. the viewer identifies himself or herself as a single viewer) then viewer registration may include but is not limited to (i) Acceptance of single viewer user agreement and (ii) Captcha (Human Verification). Numeral 363 represents the submission of the single viewer registration upon which the viewer identified as a single viewer in question number (iv) and the creation of a single viewer account. Upon submission of the viewer registration for a single viewer user (Numeral 357) a single viewer (Numeral 362) may then be allowed access to the single viewer home page (Numeral 364). Numeral 364 represents the single viewer user's (Numeral 362) individualized viewer homepage which may include items such as: (i) link social media page feed; (ii) single viewer help link; (iii) ability to browse the content libraries; (iv) ability of users to view purchased content; (v) single viewer account settings options; and (vi) ability to look up producers and rate their shows. Numeral 365 represents a single viewer user (Numeral 362) choosing to browse the content libraries which include but are not limited to the Show section of the combined content library (Numeral 341), On-Demand section of the content library (Numeral 333), and the Channel section of the content library (Numeral 326). Numeral 345 represents a single viewer user selecting a show for viewing from the show section of the content library (Numeral 341). Numeral 343 represents the cyber seat ticket for an single viewer user which is the result of a show posted to the show section of the content library (Numeral 341) as a result of the producer user's (Numeral 301) submission of show listing(s) (Numeral 340). A Cyber seat ticket (Numeral 343) allows a single viewer user (Numeral 362) to purchase a viewing to a one time showing of a show. Numeral 346 represents a single viewer user selecting an On-demand piece of content for viewing from the On-Demand section of the content library (Numeral 333). Numeral 334 represents the On-Demand rental for an single viewer user which is the result of an On-Demand piece of content posted to the On Demand section of the content library (Numeral 333) as a result of the producer user's (Numeral 301) submission of On-Demand content listing(s) from show (Numeral 338) or submission of On-Demand content listing(s) from events on a channel (Numeral 332). An On-Demand rental for a single viewer user (Numeral 334) allows a single viewer user (Numeral 362) to purchase the right to view a piece of On-demand content for either a pre-set number of times or a pre-set amount of time. Numeral 335 represents the on demand purchase of a digital copy of an on demand piece of content which is the result of content posted to the on demand section of the content library as a result of the producer user's (Numeral 301) submission of On-Demand content listing(s) from show (Numeral 338) or submission of On-Demand content listing(s) from events on a channel (Numeral 332). An On-Demand purchase of a digital copy for a single viewer user (Numeral 335) allows a single viewer user (Numeral 362) to purchase the right to view a piece of On-demand content. Numeral 347 represents a single viewer user selecting a channel for viewing from the channel section of the content library (Numeral 326). Numeral 328 represents the Subscription Ticket for single viewer users which is the result of an channel piece of content being posted to the channel section of the content library (Numeral 326) as a result of the producer user's (Numeral 301) submission of channel content listing(s) (Numeral 325). A Subscription Ticket for a single viewer user (Numeral 328) allows a single viewer user (Numeral 362) to purchase the right to view a channel for a preset amount of time on a subscription basis.

Numeral 357 represents viewer registration for either a single viewer (Numeral 362) or a commercial viewer (Numeral 361). In viewer registration (Numeral 357) a Commercial viewer (Numeral 361) may be required to input information for producer registration which may include but is not limited to (i) requested screenname; (ii) Email address; (iii) requested password; and (iv) whether or not the viewer account to be registered is for single self-serving viewing purposes or is for public viewing in an established venue. As a Commercial viewer's answer to number (iv) would be "yes" (i.e., viewer identifies itself as a commercial viewer), the viewer registration may include but is not limited to (i) the name of the person registering the commercial viewer account; (ii) title or position of the person registering the commercial viewer account; (iii) Company name of company for which the commercial viewer account is to be used by; (iv) Company tax identification number; (v) Acceptance of Commercial viewer user agreement and option to print, execute, and reattached executed copy for review; (vi) Physical address where the content purchased by this account will be shown; (vii) Billing information; (viii) Billing address; and (ix) Captcha (Human Verification). Numeral 356 represents the submission of the commercial viewer registration (Numeral 352) upon which the viewer identified as a commercial viewer in question number (iv) and the registration is submitted to an admin user for review. Numeral 355 represents the review of the commercial viewer registration (Numeral 357) in which the admin approves or denies the commercial viewer's registration. Numeral 359 represents a commercial viewer's registration being declined. Numeral 358 represents the commercial user being sent an email stating reason that their commercial viewer registration (Numeral 357) was denied and possible corrective actions if applicable. Numeral 354 represents the approval of a commercial user's registration (Numeral 357). Numeral 353 represents the commercial user being sent an email stating that their registration has been approved, asking them to verify their email, and providing them with access to their commercial viewer homepage (Numeral 352). Numeral 352 represents the commercial viewer homepage which may provide the commercial viewer user the ability to but is not limited to (i) linking social media; (ii) Posting photos in the commercial viewers gallery; (iii) ability to add "about us" section for commercial viewer; (iv) ability to edit location of physical venue where commercial viewer shows its purchased content; (v) ability to edit "contact us" section for commercial viewer; (vi) Link to commercial viewer website; (vii) Commercial viewer help link; (viii) ability to browse content libraries; (ix) ability to view commercial viewers purchased content; and (x) Commercial viewer account settings options. Numeral 351 represents a commercial viewer user (Numeral 361) selecting the option to browse content libraries from the commercial viewer user homepage (Numeral 352). Numeral 348 represents a commercial viewer user (Numeral 361) selecting a show piece of content from the show content library (Numeral 341). Numeral 342 represents a commercial cyber seat ticket which is the result of a show posted to the show section of the content library as a result of the producer user's (Numeral 301) submission of show listing(s) (Numeral 340) in which the producer user (Numeral 301) stated in show registration (Numeral 319) that they wanted to allow commercial viewers to show their show in the commercial users space. A commercial cyber seat ticket (Numeral 342) allows a commercial viewer user (Numeral 362) to purchase a viewing to a one time showing of a show and show that viewing to a public audience. Numeral 349 represents a commercial viewer user (Numeral 361) selecting an On-Demand rental piece of content from the On-Demand section of content library (Numeral 333). Numeral 329 represents the On-Demand rental for an Commercial viewer user (Numeral 361) which is the result of an On-Demand piece of content posted to the On Demand section of the content library (Numeral 333) as a result of the producer user's (Numeral 301) submission of On-Demand content listing(s) from show (Numeral 338) or submission of On-Demand content listing(s) from events on a channel (Numeral 332). An On-Demand rental for a commercial viewer user (Numeral 329) allows a commercial viewer user (Numeral 362) to purchase the right to show a piece of On-demand content for either a pre-set number of times or a pre-set amount of time to a public audience in the commercial viewers commercial space. Numeral 350 represents a commercial viewer user (Numeral 361) selecting a Channel for viewing from the Channel section of content library (Numeral 326). Numeral 327 represents the Subscription Ticket for commercial viewer users which is the result of a channel piece of content being posted to the channel section of the content library (Numeral 326) as a result of the producer user's (Numeral 301) submission of channel content listing(s) (Numeral 325). A Subscription Ticket for a commercial viewer user (Numeral 327) allows a commercial viewer user (Numeral 361) to purchase the right to show a channel for a preset amount of time on a subscription basis to public audience in the commercial viewer's commercial space.

Figure 4:
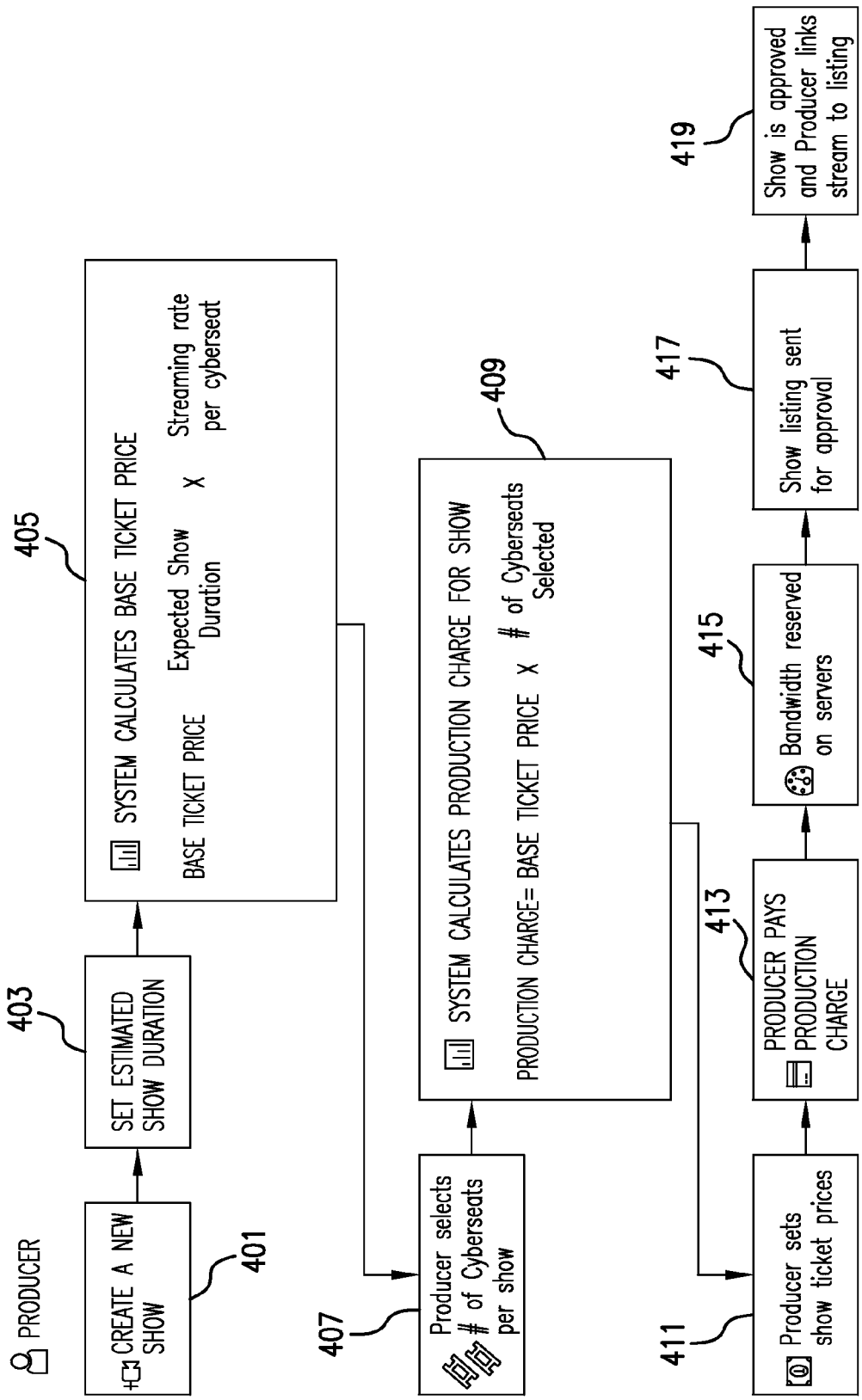
FIG. 4 is a block diagram of an embodiment of the event streaming system including the creation of cyberseats and bandwidth cost calculations for those cyberseats.

FIG. 4 illustrates another embodiment of the disclosed system. The system may allow a producer user to create a new show/event 401 and set an estimated duration for the event/show in step 403. After receiving the estimated show/event duration, the system may calculate a base ticket price of the show/event in step 405 by multiplying the estimated show duration stated in step 403 by the streaming rate per a cyberseat as calculated in step 103 of FIG. 1. The producer user may select a number of cyberseats to issue for the show/event in step 407, and the system may calculate a production charge in step 409 for the show by multiplying the base ticket price as calculated in 405 by the number of cyberseats to issue as stated in 407. The producer user may set a ticket price for the event/show in step 411 and pay the calculated production charge in step 413 for the event/show. The system may allow the producer user to make a profit by setting a retail price in step 411 defined by a price set above the calculated base ticket price in step 405.

After the ticket price is set and the production charge is paid, a bandwidth rate may be reserved for the show/event by the servers in step 415. The new show, with ticket price set and bandwidth reserved, may be sent for approval to an administrator in step 417. After approval by the administrator in step 417, the show/event may be added to the producer user's or the company's (e.g., provider of streaming service) website, mobile application, or software platform for streaming 419.

Figure 5:
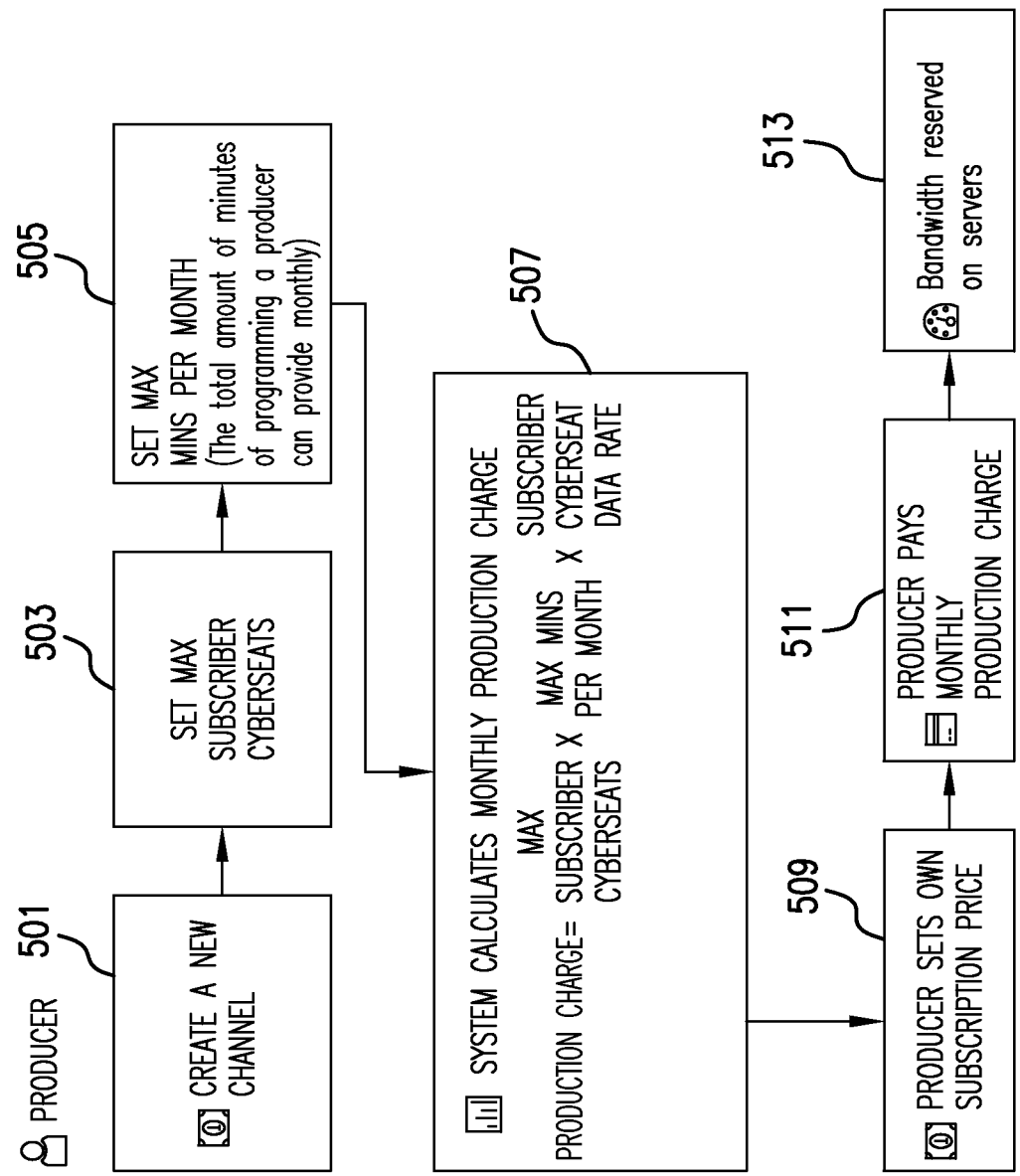
FIG. 5 is a block diagram of an embodiment of the event streaming system including the creation of cyberseats and bandwidth cost calculations for those cyberseats.

FIG. 5 illustrates another embodiment of the disclosed system. A producer user may create a new channel 501 on the system's content management platform. The producer user may set a maximum amount of subscriber cyberseats in step 503 to the new channel 501 defined by the total amount of subscriber users that can view content on the new channel. The producer user may also set a maximum minutes per month in step 505 on the new channel defined by the total amount of minutes of programming the producer can provide monthly. After setting the maximum subscriber cyberseats and maximum minutes of the new channel, the system may calculate the monthly production charge 507 for the new channel by multiplying the maximum amount of subscriber cyberseats stated in step 503 by the maximum minutes per month stated in step 503 by the subscriber cyberseat data rate which is equal to the streaming rate per a cyberseat as calculated in step 103 of FIG. 1. The producer user may set a subscription price 509 for the new channel and pay the calculated monthly production charge 511. After the subscription price is set 509 and monthly production charge is paid 511, a calculated bandwidth 513 may be reserved on a server.

Figure 6:
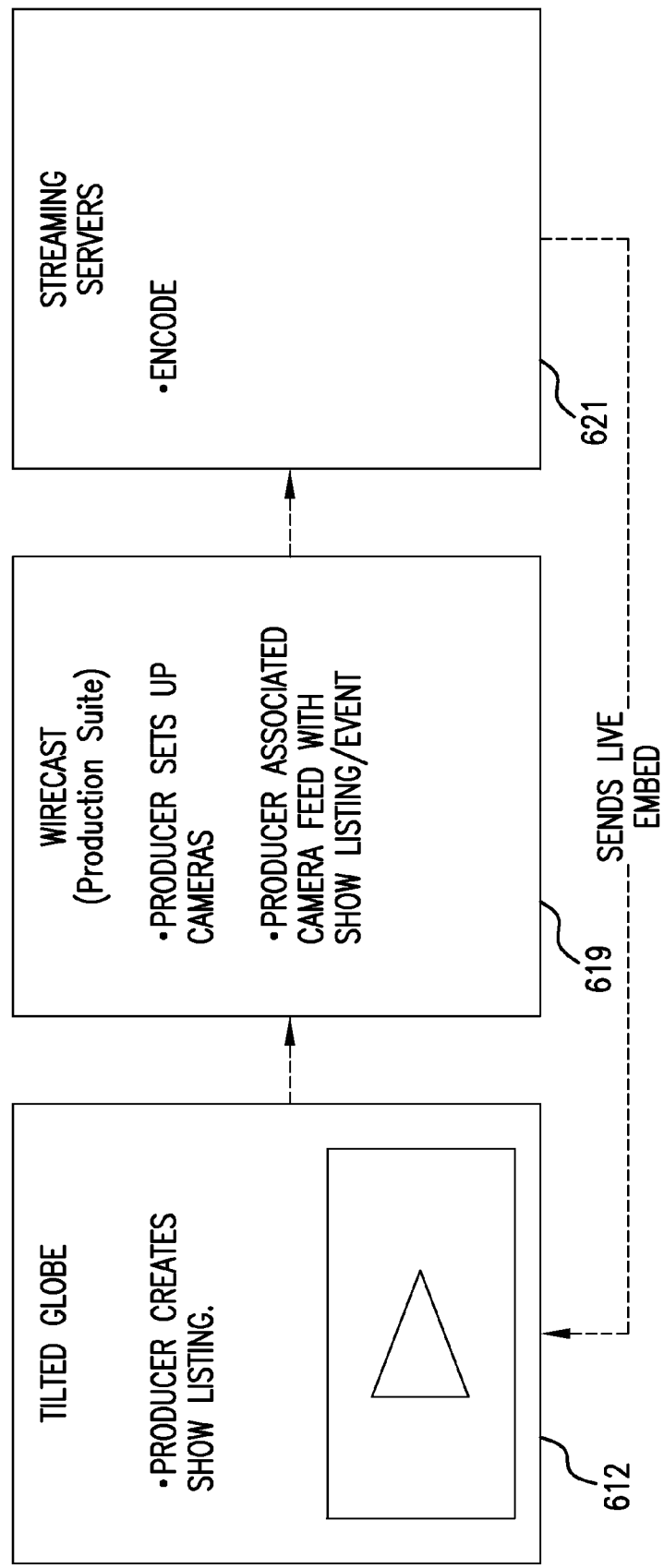
FIG. 6 is a block diagram of an embodiment of the secure connection and streaming path that may be established for every event.

FIG. 6 illustrates another embodiment of the disclosed system. The system may include a content management platform 612 that reserves and transmits data about a show/event to a production content program 619 that records the live event/shows and may apply a compression algorithm to the produced media data. The production content program 619 may transmit the live/show media data to streaming servers 621 that may apply or change the compression algorithm further, duplicates the media data stream, and may provide further encoding to the data stream. The streaming servers 621 may continuously transmit live embedded data connection back to the content management platform 612 which allows viewers access and consume the media data.

The content management platform 612 may allow a producer user to create new content for a show/event including show/event name or title, type of show/event, description of the show/event, duration of the show/event, pricing for the show/event or video, payment options for the show/event, viewer rating of the show/event, and date and time of the show/event. Additionally, the content management interface platform 612 may allow a producer user to create a plurality of shows/events. The production platform 619 may allow a producer user to set up a plurality of cameras and plurality of microphones to record a live show/event and transmit the show/event to streaming servers 621 allowing a plurality of commercial viewers and plurality of single viewers to view the live/show content information and video. The streaming servers 621 may continuously send live embedded data back to the management content platform 612 that may include data or information about cyberseat purchases, cyberseat subscriptions, viewer ratings, or bandwidth rates.

In addition, the content management platform 612 may allow the producer user to set up and list show/events concurrently with other shows/events, as well as, create a channel of events/shows. These shows/events and channels may be defined as a combined content library where commercial viewers or singe viewers may view, select shows/events or channel to stream to their devices.

Figure 7:
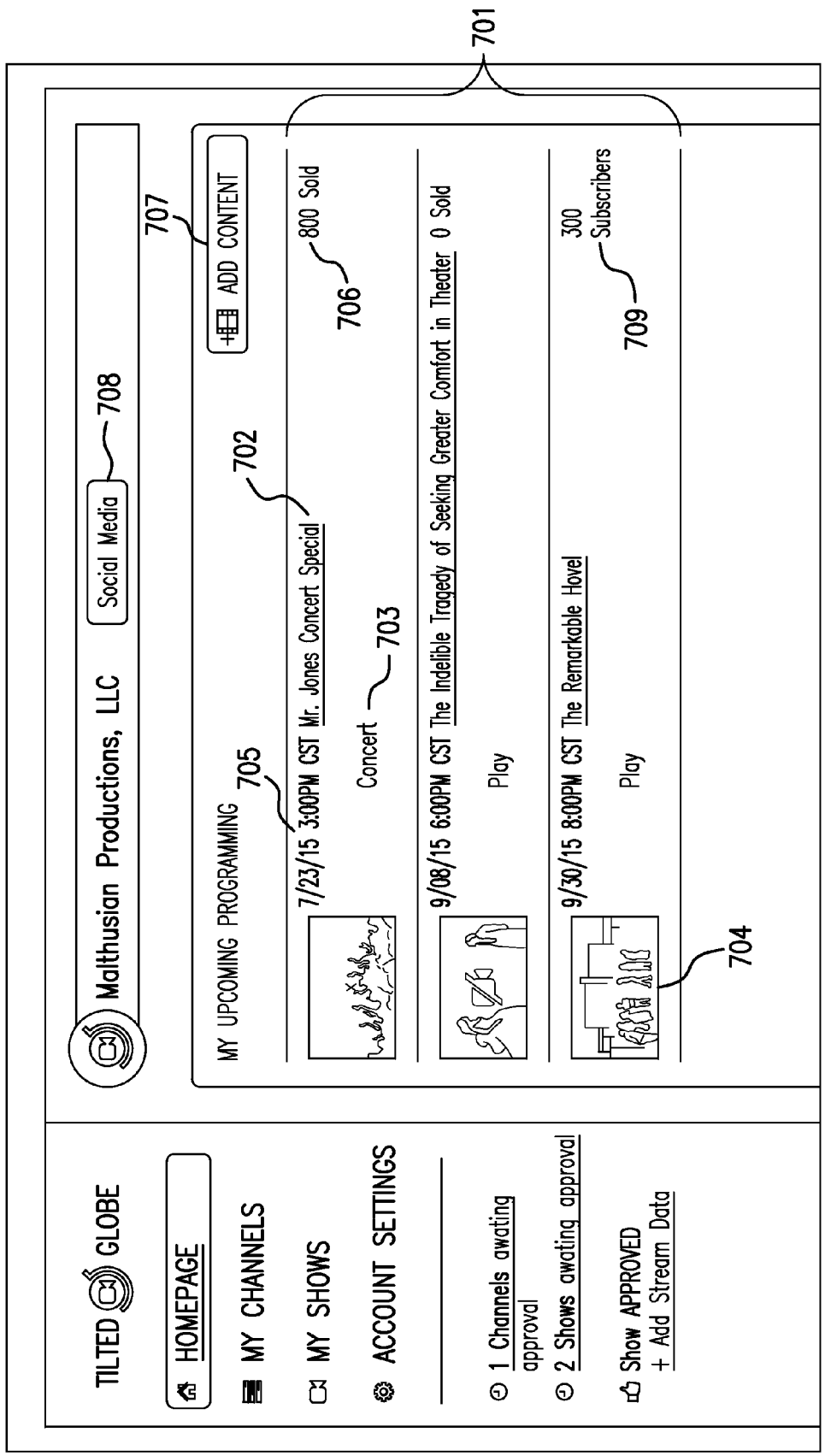
FIG. 7 is a sample illustration of an individual producer's home page in accordance with one embodiment.

FIG. 7 is a sample illustration of an individual producer's home page in accordance with one embodiment of the disclosure. A producer home page may allow the producer user to create new shows/events and manage current shows/events. The producer page may display upcoming programming including multiple shows/events 701 that may list the titles of the shows/events 702, descriptions of the shows/events 703, photographs of shows/events 704, dates and times of the shows/events 705, and tickets sold to the event/shows 706 (or alternatively number of subscribers 709). The producer home page may also comprise of an "add content" link 707 wherein the producer can add additional shows, channels, or on-demand programming. The producer page may also include links to producer user's website and social media sites 708.

Figure 8:
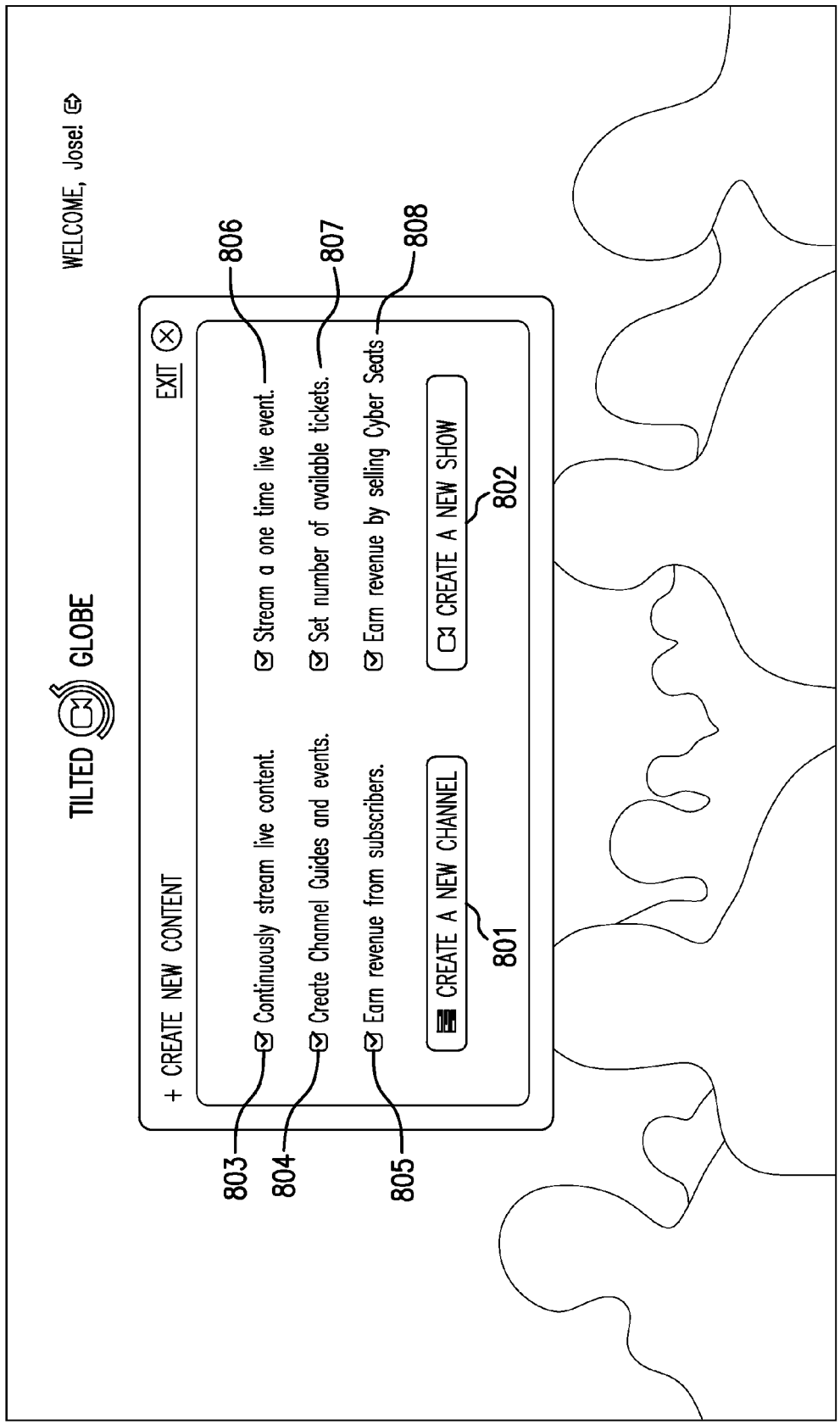
FIG. 8 is a sample illustration of the portal for creating new content in accordance with one embodiment.

FIG. 8 is a sample illustration of the portal for creating new content in accordance with one embodiment. A "create new content" page may allow the producer user to create and register new content that the producer user wants to sell such as a new channel 801 or a new show 802. In addition, the create new content page may allow the producer user to select or unselect channel settings or show settings. The producer user's new channel settings may comprise the new channel to continuously stream live content 803, create channel guides and events 804, or earn revenue from subscribers 805. The producer user's new show settings may comprise the new show to stream a one-time event live 806, set a number of available tickets (for live attendance) 807, or earn revenue by selling cyberseats 808.

Figure 9:
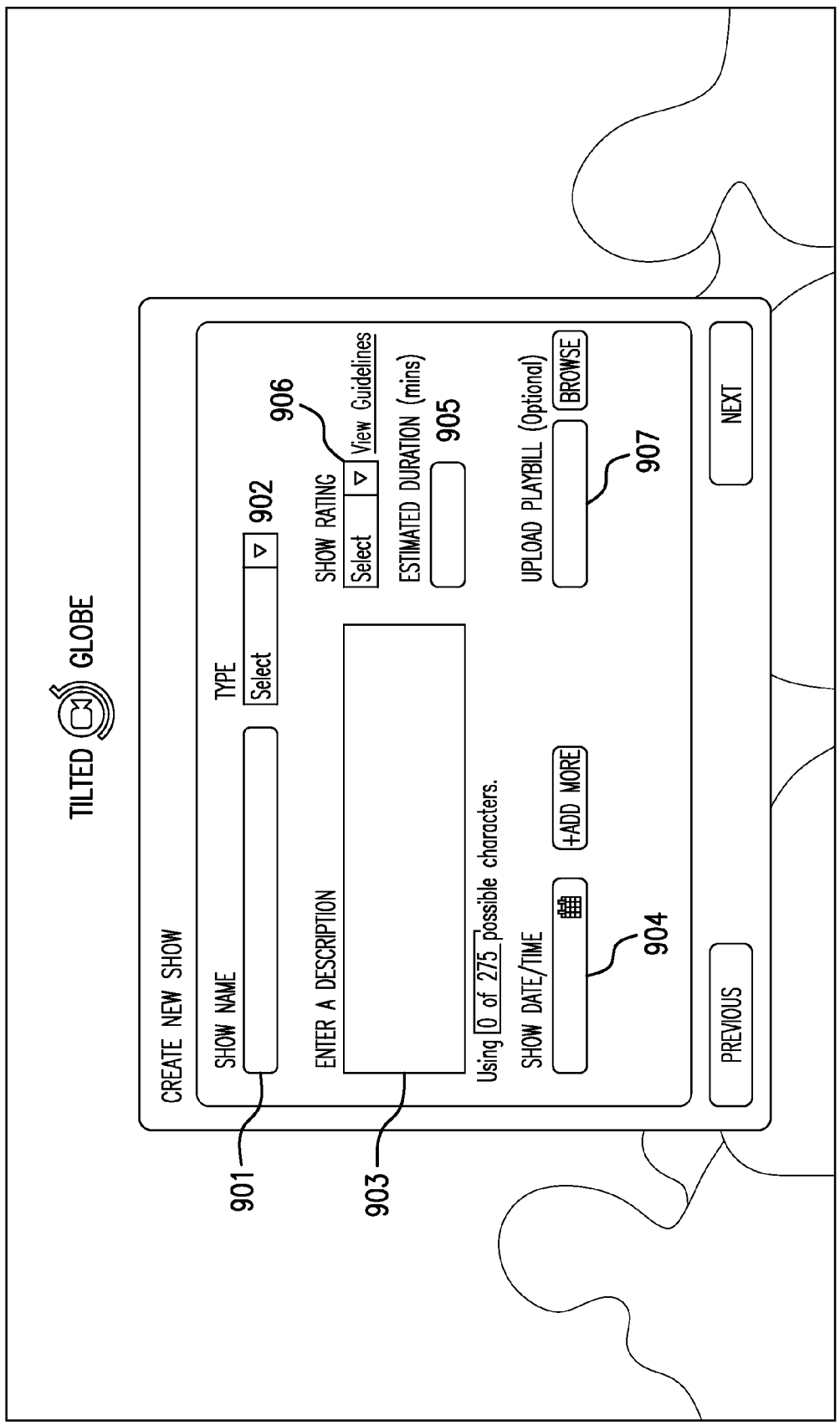
FIG. 9 is a sample illustration of a "create new show" form in accordance with one embodiment.

FIG. 9 is an illustration of a create new show form content in accordance with one embodiment. A "create new show" page may allow the producer user to create and register a new show/event. The producer user may enter information about the new show including a show/event name 901, a type of show/event 902, a description of the show/event 903, a date and time of the show/event 904, an estimated duration of the show/event 905, and a rating of the show/event 906. The "create new show" page may also allow the producer user to upload the newly created show/event's playbill 907.

FIG. 10 is a sample illustration of a "create new show" form and cyberseat price calculations in accordance with one embodiment. A cyberseat creation page may allow the producer user to request and enter a number of cyberseats to reserve for a plurality of new shows/events and a retail price for a single cyberseat to each of the new shows/events. The cyberseat creation page may comprise the new shows/events names 1001, date and times 1002, a cyberseat base price 1003, cyberseats issued 1004, and a cyberseat retail price 1005. The cyberseat creation page may also allow the producer user to reserve cyberseats and set cyberseat retail prices separately for single viewer cyberseats 1006 and commercial viewer cyberseats 1007. The cyberseat creation page may also display the system's calculations for a total production charge 1008, a gross potential earnings 1009, and a potential net profit 1010 for the newly created shows/events. In addition, the producer user may display a photograph or an image of the event/show 1011 on the cyberseat creation.

Figure 11:
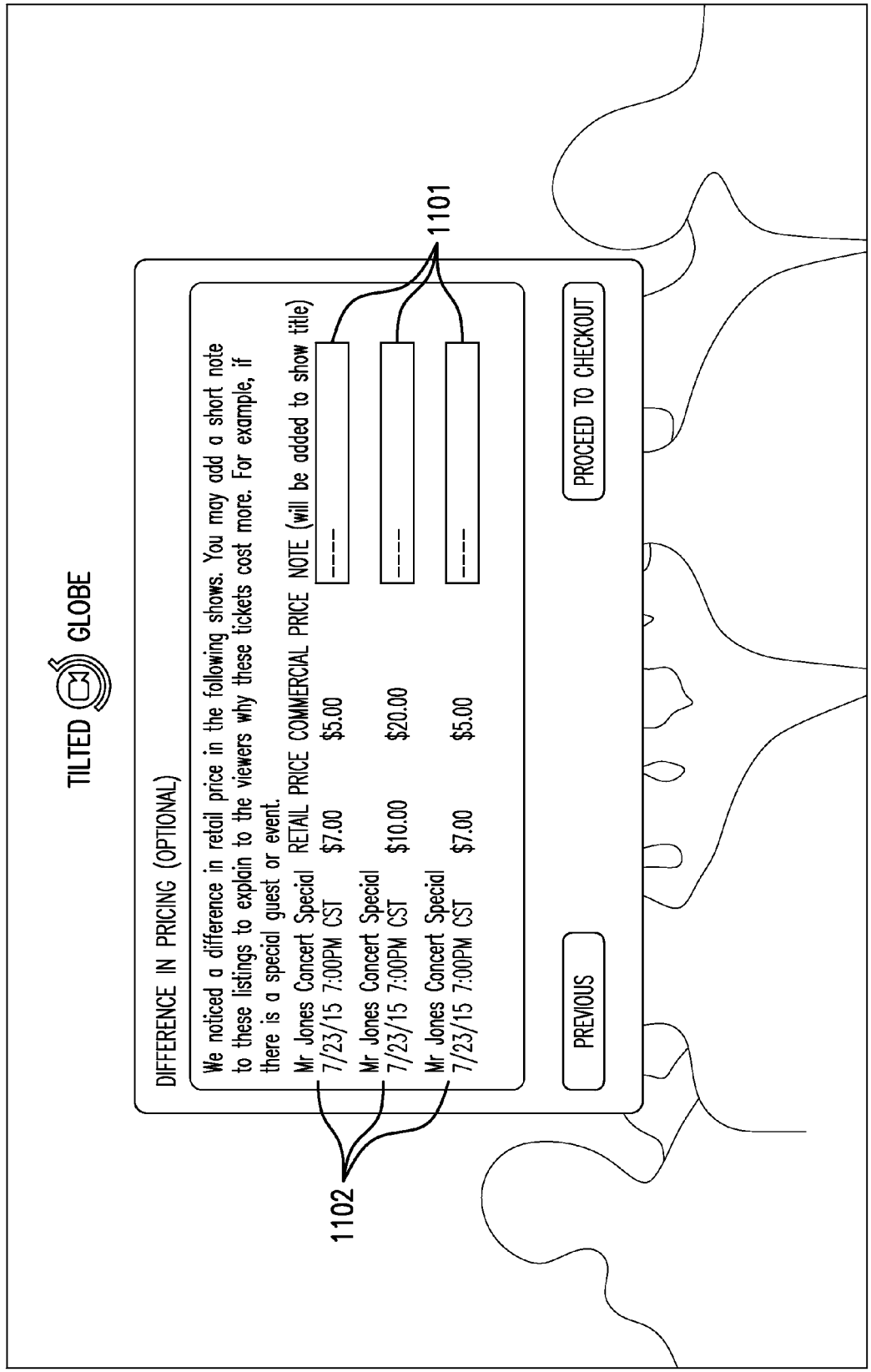
FIG. 11 is a sample illustration of an optional portion of the "create new show" form in accordance with one embodiment.

FIG. 11 is a sample illustration of an optional portion of the "create new show" form in accordance with one embodiment. The system may allow the producer user to enter notes if the producer user sets different retail prices for each recurrence of the new show/event. A difference in pricing page allows the producer user to include a note 1101 to the new show/event listings 1102 to explain why the pricing is different for the shows/events. For example, the producer user may explain that a certain show/event may include a special guest, a special performance, a last show, a preview performance, or a rehearsal.

Figure 12:
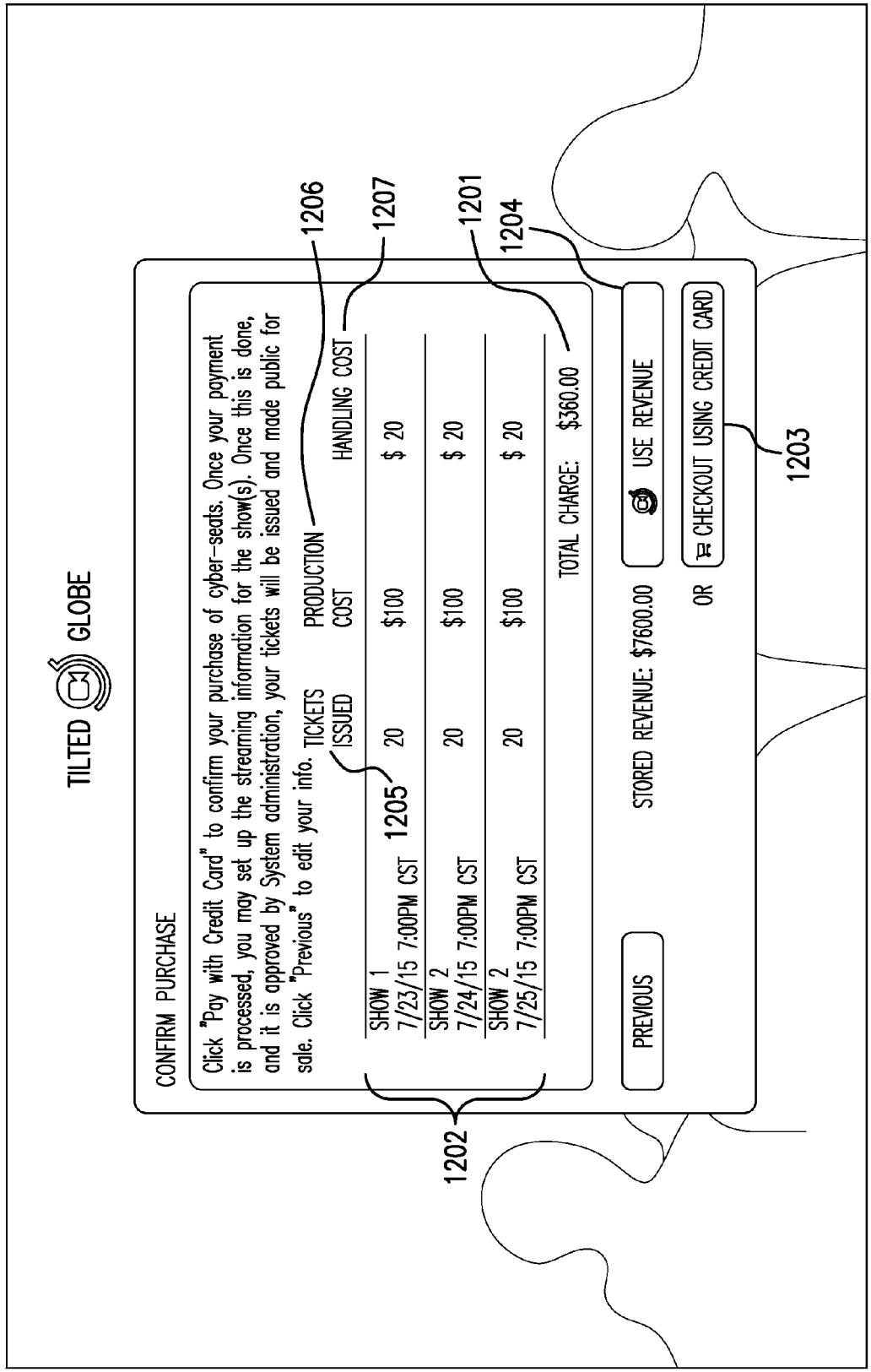
FIG. 12 is a sample illustration of the purchase confirmation portion of the "create new show" form in accordance with one embodiment.

FIG. 12 is a sample illustration of the purchase confirmation portion of the "create new show" form in accordance with one embodiment. The producer user may confirm the purchase of the plurality of new shows/events on a confirm purchase page as part of the new show/event registration process. The producer user may incur in a total charge 1201 of a plurality of new shows/events created 1202 and accept payment using a payment system such as credit card 1203 or a stored revenue account 1204 for covering production costs. The confirm purchase page may also display the tickets issued 1205, the production cost 1206, and handling cost 1207 for each of the new shows/events created.

Figure 13:
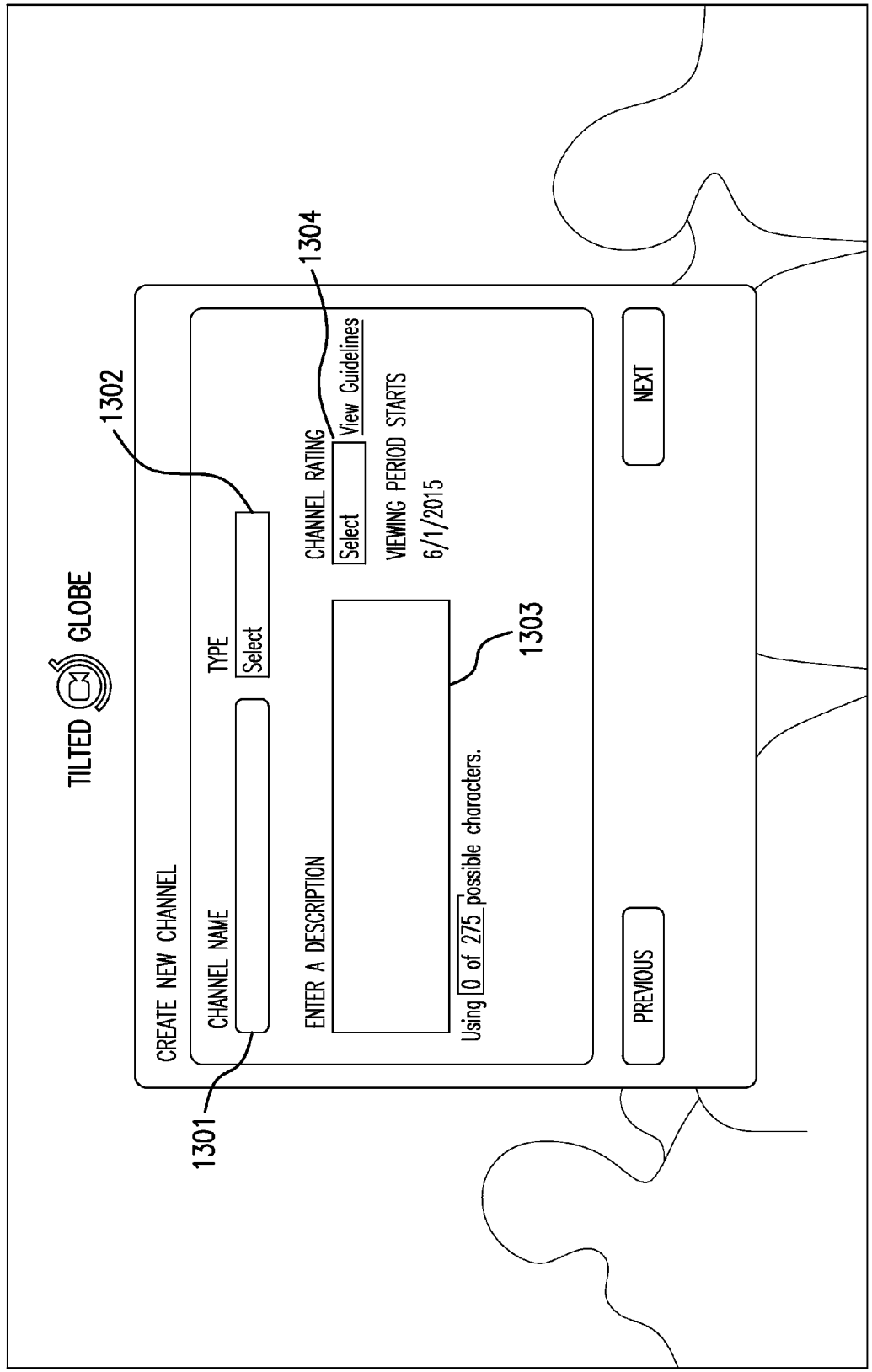
FIG. 13 is a sample illustration of a "create new channel" form in accordance with one embodiment.

FIG. 13 is a sample illustration of a "create new channel" form in accordance with one embodiment. A create new channel page may allow the producer user to create and register a new channel. The producer user may enter information about the new show including a channel name 1301, a type of channel 1302, a description of the channel 1303, and a rating of the show/event 1304.

Figure 14:
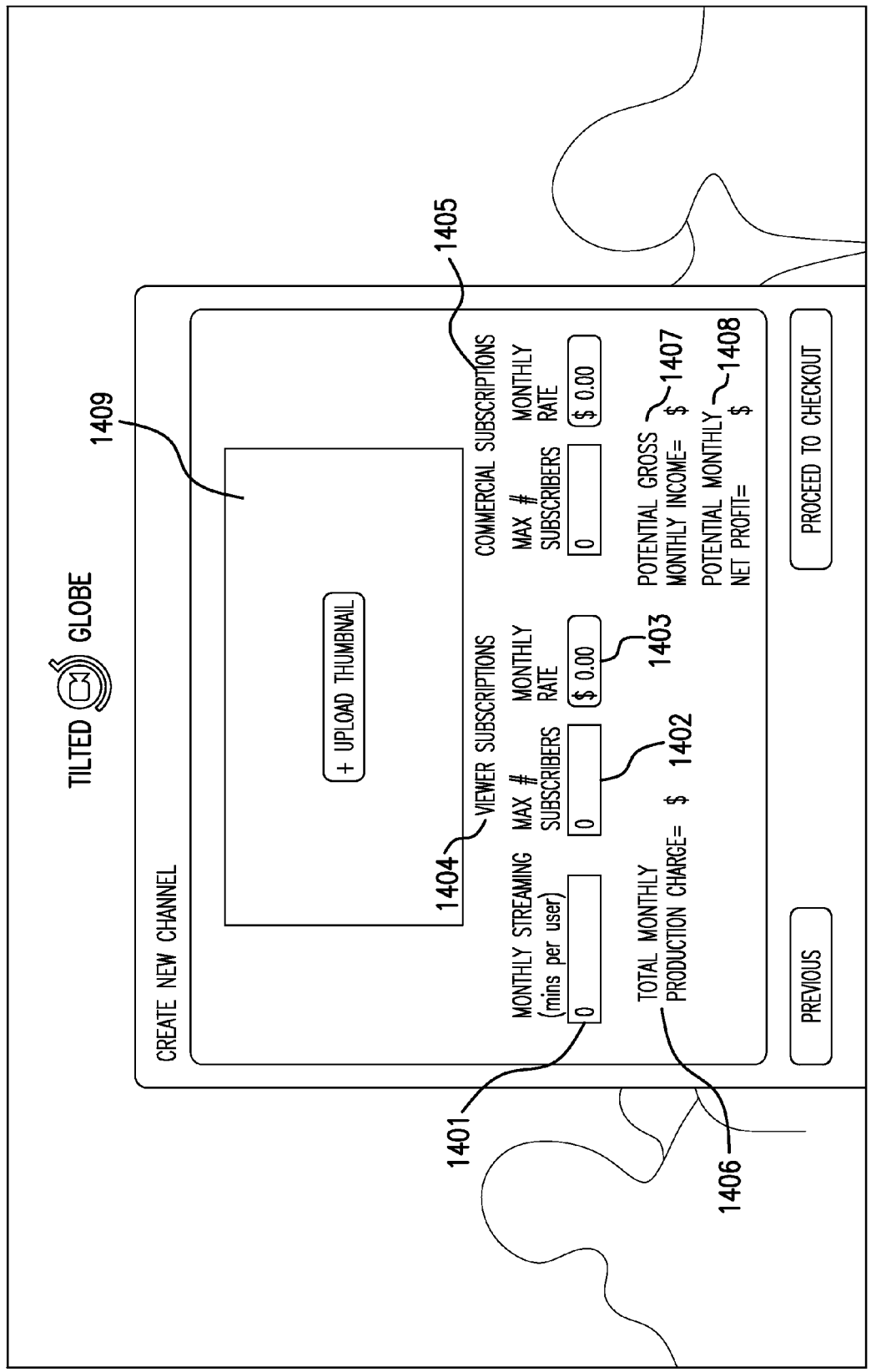
FIG. 14 is a sample illustration of a "create new channel" form and cyberseat price calculations wherein the cyberseat is referred to as a subscriber and the show duration is referred to as monthly streaming minutes per user in accordance with one embodiment.

FIG. 14 is a sample illustration of a "create new channel" form and cyberseat price calculations wherein the cyberseat is referred to as a subscriber and the show duration is referred to as monthly streaming minutes per user in accordance with one embodiment. A cyberseat subscription page may allow the producer user to create cyberseat subscriptions for a new channel. The cyberseat subscription page may display a monthly streaming allotment 1401. The cyberseat subscription page may also include a maximum number of subscribers to the new channel 1402 and a monthly rate for the subscription 1403. The cyberseat subscription page may allow for separate entries for the maximum subscriber allotment 1402 and monthly rate 1403 for single viewer subscriptions 1404 and commercial viewer subscriptions 1405. The cyberseat subscription page may also comprise the system's calculations for a total production charge 1406, a gross potential earnings 1407, and a potential net profit 1408 for the new channel. In addition, the producer user may display a photograph or an image 1409 on the subscription page.

Figure 15:
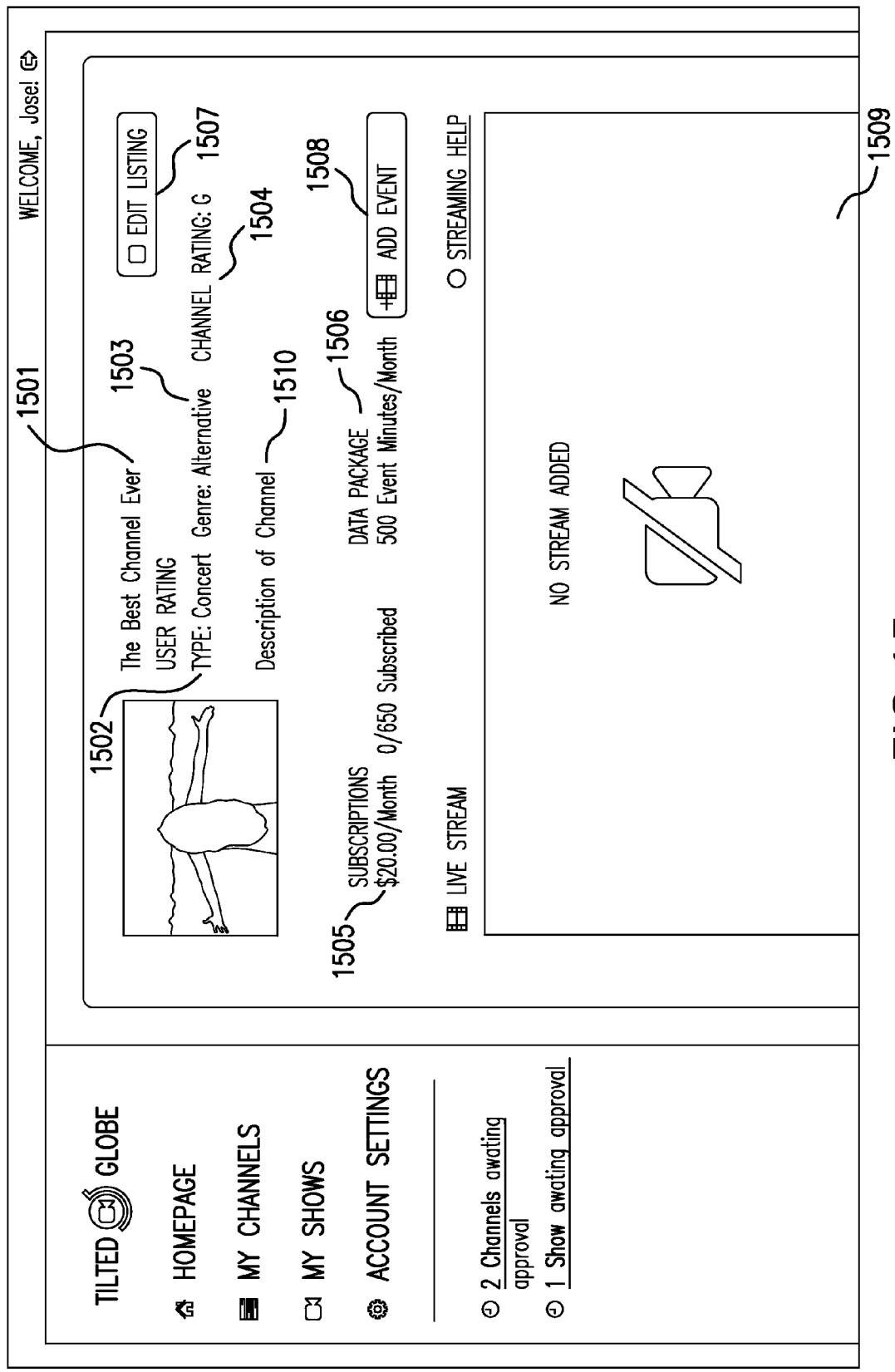
FIG. 15 is a sample illustration of a channel page within a content library in accordance with one embodiment.

FIG. 15 is a sample illustration of a channel page within a content library in accordance with one embodiment. The system may include a channel management page after the channel registration is completed that may allow the producer user to edit and manage the new channel. The channel management page may comprise channel title 1501, channel type 1502, genre type 1503, channel description 1510, and channel rating 1504. The channel management page may also include a monthly subscription price 1505 and a data package 1506. The producer user may also edit the content of the present listing 1507, add an additional event to the channel 1508, or stream an event 1509 on the channel management page.

FIG. 16 is a sample illustration of a create and/or edit event data form in accordance with one embodiment. The system may include a user interface that allows a producer to create or edit event data. This user interface may include an event title 1601, event type 1602, event genre 1603, event description 1606, and event rating 1604. The user interface may also include an estimated event duration 1605 and an event date 1607. The producer user may also update the content of the present listing 1609, add a picture related to the event 1608.

FIG. 17 is a sample illustration of a viewer's homepage in accordance with one embodiment. A single viewer homepage allows a single viewer to browse and view a plurality of content 1701 from the combined content library. The plurality of content may comprise a show/event title 1702, an event or channel description 1703, a date and time 1704, and a cyberseat price and a number of cyberseats remaining 1705. In addition, the single viewer homepage may allow the single viewer to search the combined content library by a name, producer, event or channel search 1706, a type search 1707, and a genre search 1708. The single viewer homepage may also display a side menu 1709 that may be comprised of links to channels, shows and account settings. The single viewer homepage may further display a top menu 1710 that may comprise of links to recommended shows, upcoming shows, channels, and on-demand programming.

Figure 18:
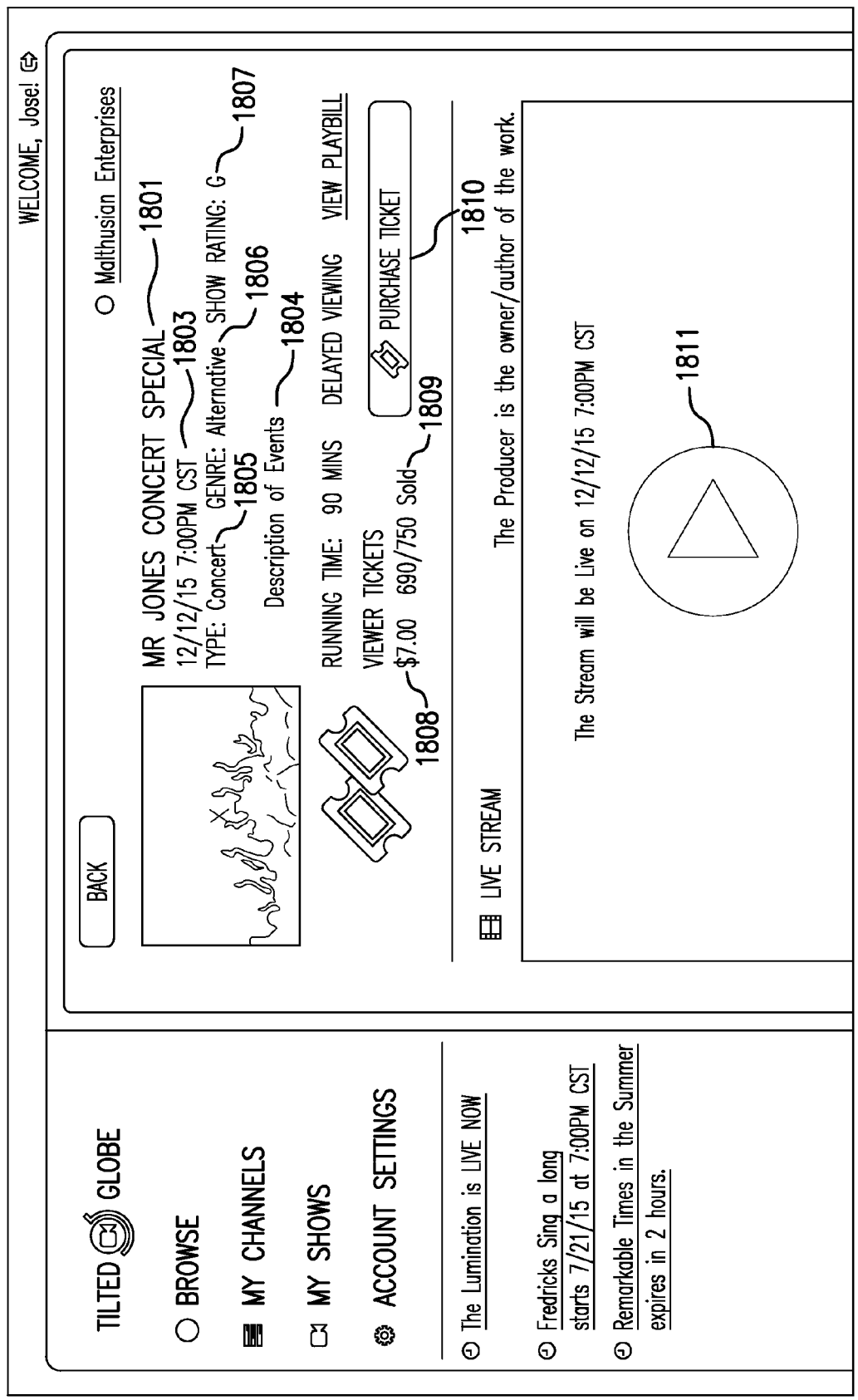
FIG. 18 is a sample illustration of a show page within the content library in accordance with one embodiment.

FIG. 18 is a sample illustration of a show page within the content library in accordance with one embodiment. A show detail page may allow a viewer to review details about an upcoming show/event before purchasing the show/event. The show detail page may comprise the show/event name or title 1801, event/show date and time 1803, event/show description 1804, event/show type of show 1805, event/show genre 1806, and show rating 1807. The show detail page may also include the cyberseat price for the show/event 1808, and the number of cyberseats available and sold for the show/event 1809. The show detail page may allow the single viewer to purchase cyberseats to the show/event 1810. The purchased show/event may stream 1811 on the show detail page.

Figure 19:
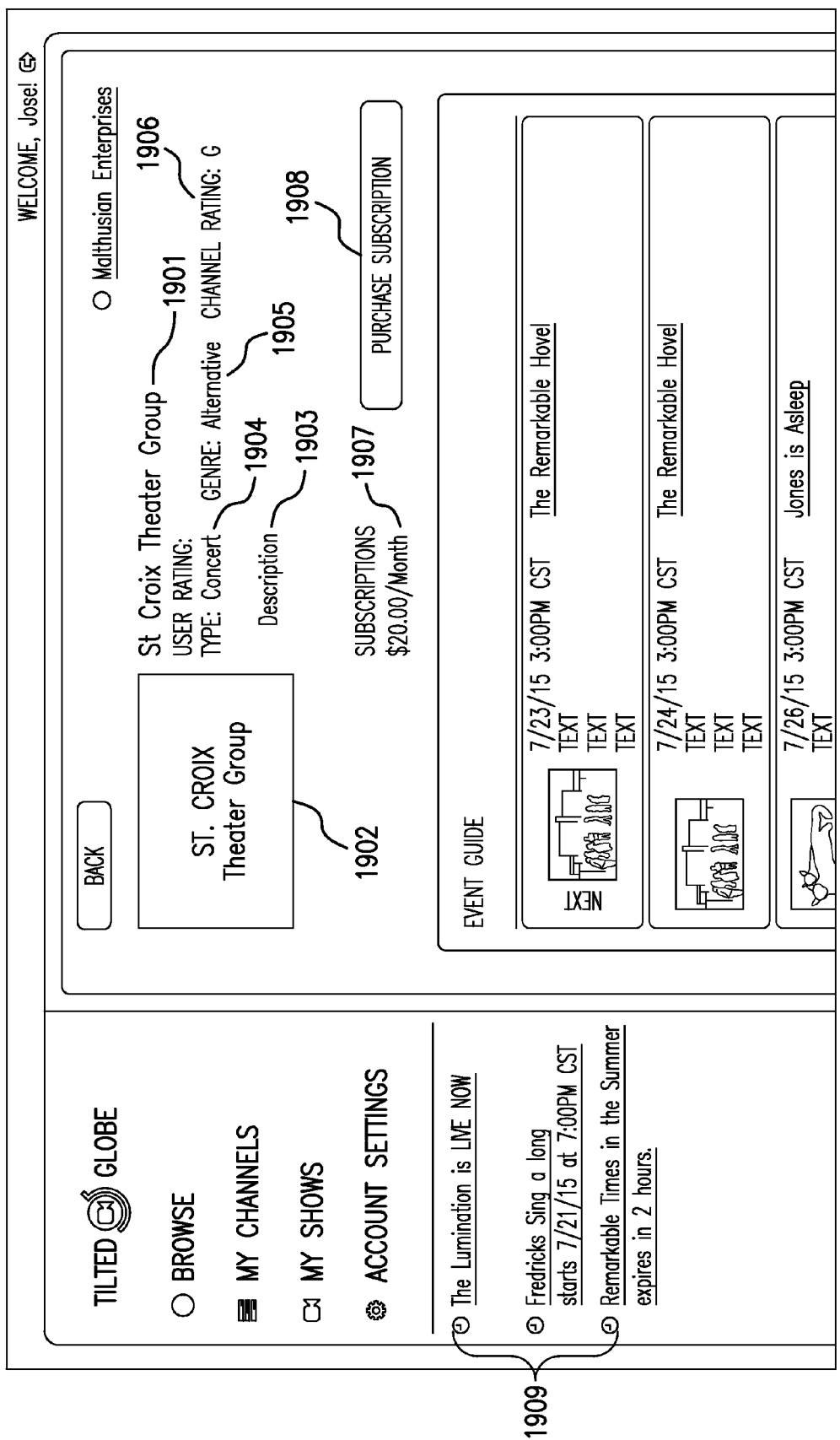
FIG. 19 is a sample illustration of a channel page within the content library in accordance with one embodiment.

FIG. 19 is a sample illustration of a channel page within the content library in accordance with one embodiment. A channel detail page may allow a viewer to review details about a channel from the combined content library before subscribing to the channel. The channel page may include the channel's name and title 1901, channel photograph or image 1902, channel description 1903, channel type 1904, channel genre 1905, and channel rating 1906. The channel detail page may also include a monthly cyberseat subscription price 1907 for the channel. The show detail page may allow the single viewer to purchase a cyberseat subscription to the channel 1908. Furthermore, the channel detail page may also include an event guide that may list a plurality of events 1909 in the channel including the each of the event's name and title, description, and date and time.

Figure 20:
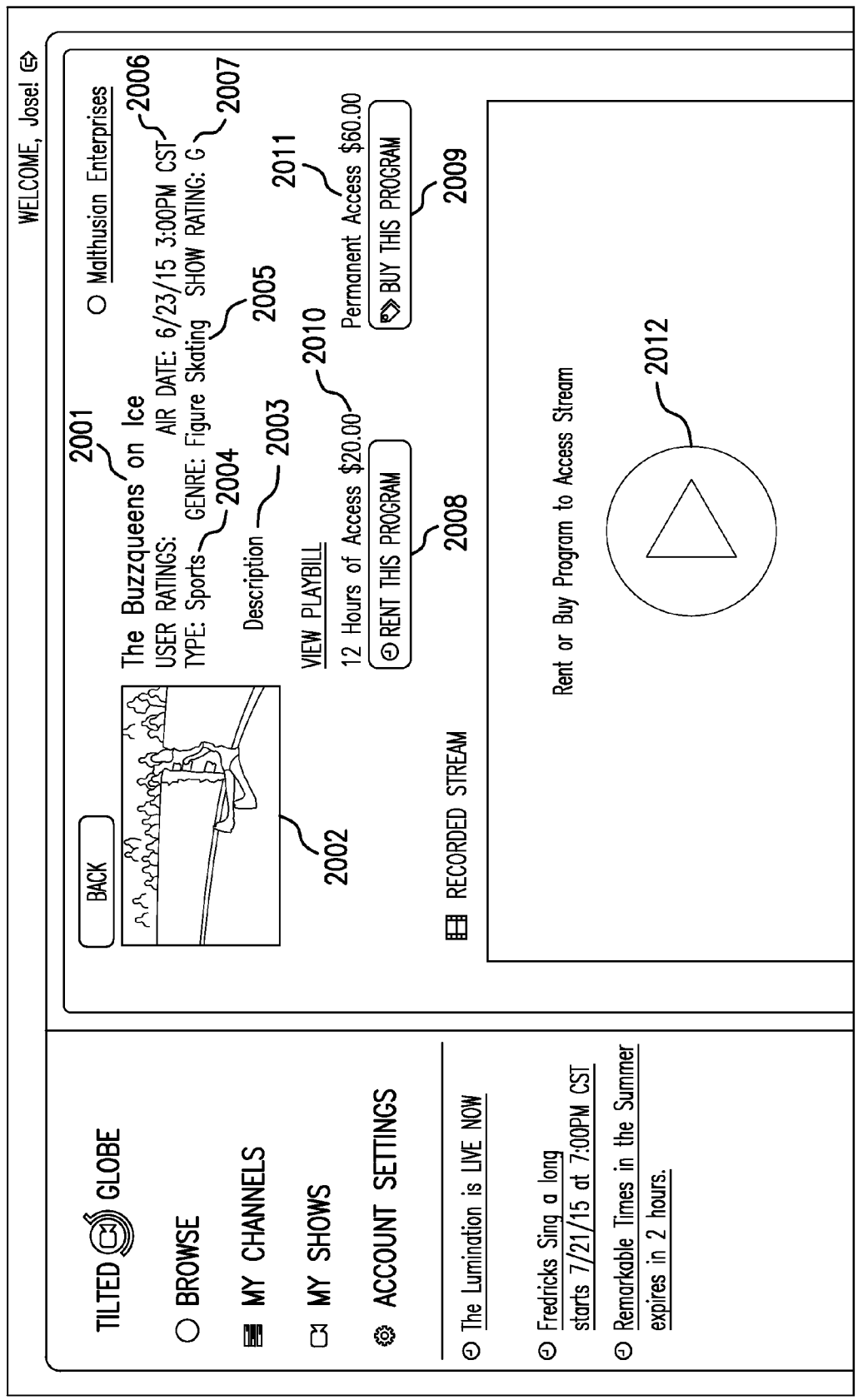
FIG. 20 is a sample illustration of an on-demand content page within the content library in accordance with one embodiment.

FIG. 20 is a sample illustration of an on-demand content page within the content in accordance with one embodiment. An on-demand detail page may allow a viewer to review details about an on-demand show/event from the combined content library before purchasing or renting the on-demand show/event. The on-demand page may include the on-demand show/event's name and title 2001, on-demand show/event photograph or image 2002, on-demand show/event description 2003, on-demand show/event type 2004, on-demand show/event genre 2005, on-demand show/event air date 2006, and on-demand show/event rating 2007. The on-demand page may allow the single viewer to rent 2008 or purchase 2009 the on-demand show/event. The on-demand page may include a rental cyberseat price 2010 and a permanent access cyberseat price 2011. The rented or purchased on-demand event may stream 2012 on the on-demand page.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Further, the limitations of the following claims are not written in means—plus-function format and are not intended to be interpreted based on 35 U.S.C. §112(f), unless and until such claim limitations expressly use the phrase "means for" followed by a statement of function void of further structure.

The invention claimed is:

1. An online virtual theatre system comprising:
   at least one capture device for capturing video and audio of a live event and converting said video and audio into a data stream;
   a production center
      for receiving said data stream and compressing said data stream to generate a compressed data stream,
      for determining a number of one or more viewing devices subscribed or reserved to view said live event, and
      for determining data bandwidth consumption characteristics of said one or more viewing devices;
      wherein the number of viewing devices subscribed or reserved to view said live event is selectable based on a maximum number of viewing devices determined based on an estimated duration of said live event and a streaming rate associated with each viewing device;
   a server
      for receiving said compressed data stream, said number of subscribed or reserved one or more viewing devices, and said data bandwidth consumption characteristics from the production center over a network, and
      for duplicating and dividing the compressed data stream out to said one or more viewing devices depending on the number of viewing devices subscribed or reserved to view said live event;
      wherein said server reserves bandwidth for streaming out the compressed data stream to the one or more viewing devices based on a number of capture devices.

2. The system of claim 1, wherein said one or more viewing devices can view the live event through use of a Native app.

3. The system of claim 1, wherein said one or more viewing devices can view the live event through a website associated with the production center.

4. The system of claim 1, wherein said server reserves bandwidth for streaming out the compressed data stream to the one or more viewing devices based on the number of viewing devices subscribed or reserved to view said live event.

5. The system of claim 1, wherein said server reserves bandwidth for streaming out the compressed data stream to the one or more viewing devices based on a compression rate corresponding to the compressed data stream.

6. The system of claim 1, wherein said data bandwidth consumption characteristics of said one or more viewing devices correspond to tracked historical bandwidth consumption of said one or more viewing devices and said server reserves bandwidth for streaming out the compressed data stream to the one or more viewing devices based on said tracked historical bandwidth consumption.

7. The system of claim 1, wherein said production center transmits an estimated duration of said live event to said server and said server reserves bandwidth for streaming out the compressed data stream to the one or more viewing devices based on said estimated duration.

8. The system of claim 7, wherein the server calculates a base ticket price corresponding to access by said one or more viewing devices to a live event by multiplying a streaming rate by said estimated duration of said live event by said number of viewing devices subscribed or reserved.

9. An online virtual theatre system comprising:
   a production center for
      receiving a data stream sent by at least one capture device, wherein said at least one capture device captures video and audio of a live event and converts said video and audio into said data stream;
      compressing said data stream to generate a compressed data stream;
      determining a number of one or more viewing devices subscribed or reserved to view said live event;
      determining data bandwidth consumption characteristics of said one or more viewing devices, wherein the number of viewing devices subscribed or reserved to view said live event is selectable based on a maximum number of viewing devices determined based on an estimated duration of said live event and a streaming rate associated with each viewing device; and transmitting to a server over a network said compressed data stream, said number of subscribed or reserved one or more viewing devices, and said data bandwidth consumption characteristics;

wherein said server duplicates and divides the compressed data stream out to said one or more viewing devices depending on the number of viewing devices subscribed or reserved to view said live event;

wherein said server reserves bandwidth for streaming out the compressed data stream to the one or more viewing devices based on a number of capture devices.

10. The system of claim 9, wherein said production center transmits an estimated duration of said live event to said server and said server reserves bandwidth for streaming out the compressed data stream to the one or more viewing devices based on said estimated duration.

11. The system of claim 10, wherein the server calculates a base ticket price corresponding to access by said one or more viewing devices to a live event by multiplying a streaming rate by said estimated duration of said live event by said number of viewing devices subscribed or reserved.

12. A computer-readable non-transitory storage medium containing a production center application, which when executed on a processor is configured to perform an operation enabling a virtual theater system, the operation comprising:

receiving, at a production center, a data stream sent by at least one capture device, wherein said at least one capture device captures video and audio of a live event and converts said video and audio into said data stream;

compressing said data stream to generate a compressed data stream;

determining a number of one or more viewing devices subscribed or reserved to view said live event;

determining data bandwidth consumption characteristics of said one or more viewing devices, wherein the number of viewing devices subscribed or reserved to view said live event is selectable based on a maximum number of viewing devices determined based on an estimated duration of said live event and a streaming rate associated with each viewing device; and transmitting to a server over a network said compressed data stream, said number of subscribed or reserved one or more viewing devices, and said data bandwidth consumption characteristics;

wherein said server duplicates and divides the compressed data stream out to said one or more viewing devices depending on the number of viewing devices subscribed or reserved to view said live event;

wherein said server reserves bandwidth for streaming out the compressed data stream to the one or more viewing devices based on a number of capture devices.

13. The computer-readable non-transitory storage medium of claim 12, wherein said production center transmits an estimated duration of said live event to said server and said server reserves bandwidth for streaming out the compressed data stream to the one or more viewing devices based on said estimated duration.

14. The computer-readable non-transitory storage medium of claim 13, wherein the server calculates a base ticket price corresponding to access by said one or more viewing devices to a live event by multiplying a streaming rate by said estimated duration of said live event by said number of viewing devices subscribed or reserved.

15. An online virtual theatre system comprising:
a server for
receiving from a production center, over a network, a compressed data stream, a number of one or more viewing devices subscribed or reserved to view a live event, and data bandwidth consumption characteristics of said one or more viewing devices, wherein the number of viewing devices subscribed or reserved to view said live event is selectable based on a maximum number of viewing devices determined based on an estimated duration of said live event and a streaming rate associated with each viewing device;

wherein the compressed data stream is generated by said production center based on a data stream received from at least one capture device, wherein said at least one capture device captures video and audio of said live event and converts said video and audio into said data stream; and for duplicating and dividing the compressed data stream out to said one or more viewing devices depending on the number of viewing devices subscribed or reserved to view said live event;

wherein said server reserves bandwidth for streaming out the compressed data stream to the one or more viewing devices based on a number of capture devices.

16. The system of claim 15, wherein said production center transmits an estimated duration of said live event to said server and said server reserves bandwidth for streaming out the compressed data stream to the one or more viewing devices based on said estimated duration.

17. The system of claim 16, wherein the server calculates a base ticket price corresponding to access by said one or more viewing devices to a live event by multiplying a streaming rate by said estimated duration of said live event by said number of viewing devices subscribed or reserved.

18. A computer-readable non-transitory storage medium containing a data server application, which when executed on a processor is configured to perform an operation enabling a virtual theater system, the operation comprising:

receiving from a production center, over a network, a compressed data stream, a number of one or more viewing devices subscribed or reserved to view a live event, and data bandwidth consumption characteristics of said one or more viewing devices, wherein the number of viewing devices subscribed or reserved to view said live event is selectable based on a maximum number of viewing devices determined based on an estimated duration of said live event and a streaming rate associated with each viewing device;

wherein the compressed data stream is generated by said production center based on a data stream received from at least one capture device, wherein said at least one capture device captures video and audio of said live event and converts said video and audio into said data stream; and for duplicating and dividing the compressed data stream out to said one or more viewing devices depending on the number of viewing devices subscribed or reserved to view said live event;

wherein said server reserves bandwidth for streaming out the compressed data stream to the one or more viewing devices based on a number of capture devices.

19. The computer-readable non-transitory storage medium of claim 18, wherein said production center transmits an estimated duration of said live event to said server and said server reserves bandwidth for streaming out the compressed data stream to the one or more viewing devices based on said estimated duration.

20. The computer-readable non-transitory storage medium of claim 19, wherein the server application calculates a base ticket price corresponding to access by said one or more viewing devices to a live event by multiplying a streaming rate by said estimated duration of said live event by said number of viewing devices subscribed or reserved.

* * * * *